United States Patent
Dutta et al.

(10) Patent No.: US 11,877,146 B2
(45) Date of Patent: Jan. 16, 2024

(54) BEAM ASSOCIATION FOR SIDELINK FEEDBACK

(71) Applicant: QUALCOMM Incorporated, San Diego, CA (US)

(72) Inventors: Sourjya Dutta, San Diego, CA (US); Kapil Gulati, Belle Mead, NJ (US); Qing Li, Princeton Junction, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/477,123

(22) Filed: Sep. 16, 2021

(65) Prior Publication Data

US 2023/0080625 A1 Mar. 16, 2023

(51) Int. Cl.
| | |
|---|---|
| *H04W 56/00* | (2009.01) |
| *H04W 72/02* | (2009.01) |
| *H04L 1/1867* | (2023.01) |
| *H04W 72/0446* | (2023.01) |
| *H04W 72/044* | (2023.01) |
| *H04W 92/18* | (2009.01) |

(52) U.S. Cl.
CPC ........... *H04W 72/02* (2013.01); *H04L 1/1896* (2013.01); *H04W 72/046* (2013.01); *H04W 72/0446* (2013.01); *H04W 92/18* (2013.01)

(58) Field of Classification Search
CPC ............. H04W 72/02; H04W 72/0446; H04W 72/046; H04W 92/18; H04L 1/1896
USPC ....................................................... 370/329
See application file for complete search history.

(56) References Cited

U.S. PATENT DOCUMENTS

| 11,050,543 B1 | 6/2021 | Balasubramanian et al. |
| 2020/0351020 A1* | 11/2020 | Jeon ...................... H04L 5/0053 |
| 2020/0396720 A1 | 12/2020 | Li et al. |
| 2021/0160850 A1 | 5/2021 | Akkarakaran et al. |
| 2022/0217749 A1* | 7/2022 | Yu .......................... H04L 5/0094 |
| 2022/0224491 A1* | 7/2022 | Salim .................... H04L 1/1854 |

(Continued)

FOREIGN PATENT DOCUMENTS

WO  WO-2020163882 A2  8/2020

OTHER PUBLICATIONS

International Search Report and Written Opinion—PCT/US2022/042506—ISA/EPO—dated Nov. 21, 2022 (2104238WO).

*Primary Examiner* — Sai Ming Chan
(74) *Attorney, Agent, or Firm* — Holland & Hart LLP

(57) ABSTRACT

Methods, systems, and devices for wireless communications are described. A user equipment (UE) may transmit a first sidelink message using a first beam, where the first sidelink message corresponds to a feedback time interval for receiving feedback associated with the first sidelink message. The UE may transmit a second sidelink message using a second beam that is different from the first beam, where the second beam is also associated with the feedback time interval for receiving feedback associated with the second sidelink message. The UE may then select (from one of the first beam of the second beam) a receive beam to receive feedback during the feedback time interval, and based on the receive beam selection, the UE may monitor for feedback associated with the first sidelink message or the second sidelink message, or both.

30 Claims, 15 Drawing Sheets

(56) References Cited

U.S. PATENT DOCUMENTS

| | | | |
|---|---|---|---|
| 2022/0337355 A1* | 10/2022 | Do | H04L 1/1854 |
| 2023/0055280 A1* | 2/2023 | Hwang | H04W 72/20 |

* cited by examiner

BEAM ASSOCIATION FOR SIDELINK FEEDBACK

FIELD OF TECHNOLOGY

The following relates to wireless communications, including beam association for sidelink feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to communicate via a sidelink with one or more other UEs. In such examples, the UE may use beamformed transmissions to reliably convey sidelink data. In some cases, however, some techniques associated with analog beamforming for sidelink may deficient.

SUMMARY

The described techniques relate to improved methods, systems, devices, and apparatuses that support beam association for sidelink feedback. Generally, the described techniques support selection of sidelink feedback and associated receive beams to accurately receive sidelink feedback. For example, some user equipment (UE) in a wireless communications system may utilize beamforming procedures to accurately establish and maintain communications on a sidelink. A transmitting UE may transmit multiple sidelink message to a receiving UE, and may wait to receive feedback associated with the respective sidelink messages during a feedback time interval. In some cases, however, the feedback associated with the feedback messages may be mapped a same feedback channel time interval, and the transmitting UE may not be able to successfully receive both feedback transmissions in the same time interval.

In such cases, the transmitting UE may determine which feedback transmission to receive and an associated receive beam with which to receive the selected feedback message. In some examples, the transmitting UE may reference a set of static rules that may indicate which feedback transmission to receive such as selection based on priority of the sidelink transmission, latency requirements, payload size, or based on which transmission was transmitted the earliest. In some other examples, the transmitting UE may select a receive beam based on an indication received in sidelink control information or other control signaling.

A method for wireless communications at a first UE is described. The method may include transmitting a first sidelink message using a first beam of the first UE, the first sidelink message corresponding to a feedback time interval for feedback for the first sidelink message, transmitting a second sidelink message using a second beam of the first UE that is different from the first beam, the second sidelink message corresponding to the feedback time interval for feedback for the first sidelink message and for the second sidelink message, selecting, from one of the first beam or the second beam, a receive beam for receiving feedback during the feedback time interval, and monitoring for feedback using the selected receive beam, where the feedback is associated with the first sidelink message, the second sidelink message, or both.

An apparatus for wireless communications at a first UE is described. The apparatus may include a processor, memory coupled with the processor, and instructions stored in the memory. The instructions may be executable by the processor to cause the apparatus to transmit a first sidelink message using a first beam of the first UE, the first sidelink message corresponding to a feedback time interval for feedback for the first sidelink message, transmit a second sidelink message using a second beam of the first UE that is different from the first beam, the second sidelink message corresponding to the feedback time interval for feedback for the first sidelink message and for the second sidelink message, select, from one of the first beam or the second beam, a receive beam for receiving feedback during the feedback time interval, and monitor for feedback using the selected receive beam, where the feedback is associated with the first sidelink message, the second sidelink message, or both.

Another apparatus for wireless communications at a first UE is described. The apparatus may include means for transmitting a first sidelink message using a first beam of the first UE, the first sidelink message corresponding to a feedback time interval for feedback for the first sidelink message, means for transmitting a second sidelink message using a second beam of the first UE that is different from the first beam, the second sidelink message corresponding to the feedback time interval for feedback for the first sidelink message and for the second sidelink message, means for selecting, from one of the first beam or the second beam, a receive beam for receiving feedback during the feedback time interval, and means for monitoring for feedback using the selected receive beam, where the feedback is associated with the first sidelink message, the second sidelink message, or both.

A non-transitory computer-readable medium storing code for wireless communications at a first UE is described. The code may include instructions executable by a processor to transmit a first sidelink message using a first beam of the first UE, the first sidelink message corresponding to a feedback time interval for feedback for the first sidelink message, transmit a second sidelink message using a second beam of the first UE that is different from the first beam, the second sidelink message corresponding to the feedback time interval for feedback for the first sidelink message and for the second sidelink message, select, from one of the first beam or the second beam, a receive beam for receiving feedback during the feedback time interval, and monitor for feedback using the selected receive beam, where the feedback is associated with the first sidelink message, the second sidelink message, or both.

Some examples of the method, apparatuses, and non-transitory computer-readable medium described herein may further include operations, features, means, or instructions for selecting the receive beam based on one or more rules of a set of rules for receiving the feedback associated with the first sidelink message, the second sidelink message, or both.

In some examples of the method, apparatuses, and non-transitory computer-readable medium described herein, the one or more rules includes a priority rule and the method, apparatuses, and non-transitory computer-readable medium may include further operations, features, means, or instructions for determining a first priority associated with the first sidelink message and a second priority associated with the second sidelink message and selecting the receive beam associated with the first sidelink message or the second sidelink message based on the priority rule, where the priority rule indicates that the receive beam may be associated with the sidelink message having the highest priority.

In some examples of the method, apparatuses, and non-transitory computer-readable medium described herein, the one or more rules includes a latency rule and the method, apparatuses, and non-transitory computer-readable medium may include further operations, features, means, or instructions for determining a first latency target associated with the first sidelink message and a second latency target associated with the second sidelink message and selecting the receive beam associated with the first sidelink message or the second sidelink message based on the latency rule, where the latency rule indicates that the receive beam may be associated with the sidelink message having the lowest latency target.

In some examples of the method, apparatuses, and non-transitory computer-readable medium described herein, the one or more rules includes a payload rule and the method, apparatuses, and non-transitory computer-readable medium may include further operations, features, means, or instructions for determining a first payload associated with the first sidelink message and a second payload associated with the second sidelink message and selecting the receive beam associated with the first sidelink message or the second sidelink message based on the payload rule, where the payload rule indicates that the receive beam may be associated with the sidelink message having the largest payload.

In some examples of the method, apparatuses, and non-transitory computer-readable medium described herein, the one or more rules includes a transmission timing rule and the method, apparatuses, and non-transitory computer-readable medium may include further operations, features, means, or instructions for determining a transmission time for the first sidelink message and a second time of transmission for the second sidelink message and selecting the receive beam associated with the first sidelink message or the second sidelink message based on the transmission timing rule, where the transmission timing rule indicates that the receive beam may be associated with the sidelink message having an earliest transmission time.

Some examples of the method, apparatuses, and non-transitory computer-readable medium described herein may further include operations, features, means, or instructions for transmitting, to a second UE via SCI, an indication of a transmission beam used to transmit the first sidelink message, the second sidelink message, or both and transmitting, to a second UE via SCI, an indication of the selected receive beam used to receive the feedback associated with the first sidelink message, the second sidelink message, or both.

In some examples of the method, apparatuses, and non-transitory computer-readable medium described herein, the indication of the transmission beam includes a transmission configuration indicator state, a precoder index, a precoder identifier (ID), a transmit beam ID, or any combination thereof.

In some examples of the method, apparatuses, and non-transitory computer-readable medium described herein, the indication of the receive beam includes a transmission configuration indicator state, a precoder index, a precoder ID, a feedback beam ID, or any combination thereof.

In some examples of the method, apparatuses, and non-transitory computer-readable medium described herein, the indication of the transmission beam includes a transmission beam ID and the indication of the receive beam includes a feedback beam ID and the method, apparatuses, and non-transitory computer-readable medium may include further operations, features, means, or instructions for receiving the feedback using the receive beam, where a direction of the selected receive beam may be the same as a direction of the transmission beam based on the transmission beam ID being the same as the feedback beam ID.

In some examples of the method, apparatuses, and non-transitory computer-readable medium described herein, the indication of the transmission beam includes a transmission beam ID and the indication of the receive beam includes a feedback beam ID and the method, apparatuses, and non-transitory computer-readable medium may include further operations, features, means, or instructions for receiving the feedback using the receive beam, where a direction of the selected receive beam may be different from a direction of the transmission beam based on the transmission beam ID being different from the feedback beam ID.

Some examples of the method, apparatuses, and non-transitory computer-readable medium described herein may further include operations, features, means, or instructions for transmitting a packet on a beam associated with the transmission beam ID and receiving the feedback using the beam that the packet was transmitted on.

Some examples of the method, apparatuses, and non-transitory computer-readable medium described herein may further include operations, features, means, or instructions for receiving the feedback using a beam corresponding to the transmission beam ID.

Some examples of the method, apparatuses, and non-transitory computer-readable medium described herein may further include operations, features, means, or instructions for determining a mapping between the transmission beam and the receive beam, where the mapping indicates a transmission-reception beam pair in accordance with the SCI.

Some examples of the method, apparatuses, and non-transitory computer-readable medium described herein may further include operations, features, means, or instructions for maintaining the mapping between the transmission beam and the receive beam for a time duration indicated by a timer.

Some examples of the method, apparatuses, and non-transitory computer-readable medium described herein may further include operations, features, means, or instructions for receiving the feedback on a beam different than the receive beam indicated by the mapping and modifying the mapping between the transmission beam and the receive beam based on receiving the feedback on the different beam.

Some examples of the method, apparatuses, and non-transitory computer-readable medium described herein may further include operations, features, means, or instructions for receiving, via control signaling, an indication to change the mapping between the transmission beam and the receive beam.

Some examples of the method, apparatuses, and non-transitory computer-readable medium described herein may further include operations, features, means, or instructions for transmitting the first sidelink message in a first TTI of a feedback TTI bundle.

A method for wireless communications at a second UE is described. The method may include receiving a first sidelink message using a first beam of the second UE, the first sidelink message corresponding to a feedback time interval for feedback for the first sidelink message, receiving a second sidelink message using a second beam of the second UE that is different from the first beam, the second sidelink message corresponding to the feedback time interval for feedback for the first sidelink message and for the second sidelink message, selecting, from one of the first beam or the second beam, a transmission beam for transmitting feedback during the feedback time interval, and transmitting feedback to a first UE using the selected transmission beam, where the feedback is associated with the first sidelink message, the second sidelink message, or both.

An apparatus for wireless communications at a second UE is described. The apparatus may include a processor, memory coupled with the processor, and instructions stored in the memory. The instructions may be executable by the processor to cause the apparatus to receive a first sidelink message using a first beam of the second UE, the first sidelink message corresponding to a feedback time interval for feedback for the first sidelink message, receive a second sidelink message using a second beam of the second UE that is different from the first beam, the second sidelink message corresponding to the feedback time interval for feedback for the first sidelink message and for the second sidelink message, select, from one of the first beam or the second beam, a transmission beam for transmitting feedback during the feedback time interval, and transmit feedback to a first UE using the selected transmission beam, where the feedback is associated with the first sidelink message, the second sidelink message, or both.

Another apparatus for wireless communications at a second UE is described. The apparatus may include means for receiving a first sidelink message using a first beam of the second UE, the first sidelink message corresponding to a feedback time interval for feedback for the first sidelink message, means for receiving a second sidelink message using a second beam of the second UE that is different from the first beam, the second sidelink message corresponding to the feedback time interval for feedback for the first sidelink message and for the second sidelink message, means for selecting, from one of the first beam or the second beam, a transmission beam for transmitting feedback during the feedback time interval, and means for transmitting feedback to a first UE using the selected transmission beam, where the feedback is associated with the first sidelink message, the second sidelink message, or both.

A non-transitory computer-readable medium storing code for wireless communications at a second UE is described. The code may include instructions executable by a processor to receive a first sidelink message using a first beam of the second UE, the first sidelink message corresponding to a feedback time interval for feedback for the first sidelink message, receive a second sidelink message using a second beam of the second UE that is different from the first beam, the second sidelink message corresponding to the feedback time interval for feedback for the first sidelink message and for the second sidelink message, select, from one of the first beam or the second beam, a transmission beam for transmitting feedback during the feedback time interval, and transmit feedback to a first UE using the selected transmission beam, where the feedback is associated with the first sidelink message, the second sidelink message, or both.

Some examples of the method, apparatuses, and non-transitory computer-readable medium described herein may further include operations, features, means, or instructions for transmitting the transmission beam based on one or more rules of a set of rules the first UE implements for receiving the feedback associated with the first sidelink message, the second sidelink message, or both.

In some examples of the method, apparatuses, and non-transitory computer-readable medium described herein, the one or more rules includes a priority rule and the method, apparatuses, and non-transitory computer-readable medium may include further operations, features, means, or instructions for determining a first priority associated with the first sidelink message and a second priority associated with the second sidelink message and selecting the transmission beam associated with the first sidelink message or the second sidelink message based on the priority rule, where the priority rule indicates that the receive beam selected by the first UE may be associated with the sidelink message having the highest priority.

In some examples of the method, apparatuses, and non-transitory computer-readable medium described herein, the one or more rules includes a latency rule and the method, apparatuses, and non-transitory computer-readable medium may include further operations, features, means, or instructions for determining a first latency target associated with the first sidelink message and a second latency target associated with the second sidelink message and selecting the transmission beam associated with the first sidelink message or the second sidelink message based on the latency rule, where the latency rule indicates that the receive beam selected by the first UE may be associated with the sidelink message having the lowest latency target.

In some examples of the method, apparatuses, and non-transitory computer-readable medium described herein, the one or more rules includes a payload rule and the method, apparatuses, and non-transitory computer-readable medium may include further operations, features, means, or instructions for determining a first payload associated with the first sidelink message and a second payload associated with the second sidelink message and selecting the transmission beam associated with the first sidelink message or the second sidelink message based on the payload rule, where the payload rule indicates that the receive beam selected by the first UE may be associated with the sidelink message having the largest payload.

In some examples of the method, apparatuses, and non-transitory computer-readable medium described herein, the one or more rules includes a transmission timing rule and the method, apparatuses, and non-transitory computer-readable medium may include further operations, features, means, or instructions for determining a first transmission time for the first sidelink message and a second time of transmission for the second sidelink message and selecting the transmission beam associated with the first sidelink message or the second sidelink message based on the transmission timing rule, where the transmission timing rule indicates that the receive beam may be associated with the sidelink message having an earliest transmission time.

Some examples of the method, apparatuses, and non-transitory computer-readable medium described herein may further include operations, features, means, or instructions for receiving, from the first UE via sidelink control information (SCI), an indication of a receive beam for receiving the first sidelink message, the second sidelink message, or both and receiving, from the first UE via SCI, an indication of the transmission beam for transmitting the feedback associated with the first sidelink message, the second sidelink message, or both.

In some examples of the method, apparatuses, and non-transitory computer-readable medium described herein, the indication of the transmission beam includes a transmission configuration indicator state, a precoder index, a precoder ID, a transmit beam ID, or any combination thereof.

In some examples of the method, apparatuses, and non-transitory computer-readable medium described herein, the indication of the receive beam includes a transmission configuration indicator state, a precoder index, a precoder ID, a feedback beam ID, or any combination thereof.

In some examples of the method, apparatuses, and non-transitory computer-readable medium described herein, the indication of the receive beam includes a transmission beam ID and the indication of the transmission beam includes a feedback beam ID and the method, apparatuses, and non-transitory computer-readable medium may include further operations, features, means, or instructions for transmitting the feedback using the transmission beam, where a direction of the transmission beam may be the same as a direction of the receive beam based on the transmission beam ID being the same as the feedback beam ID.

DETAILED DESCRIPTION

Figure 1:
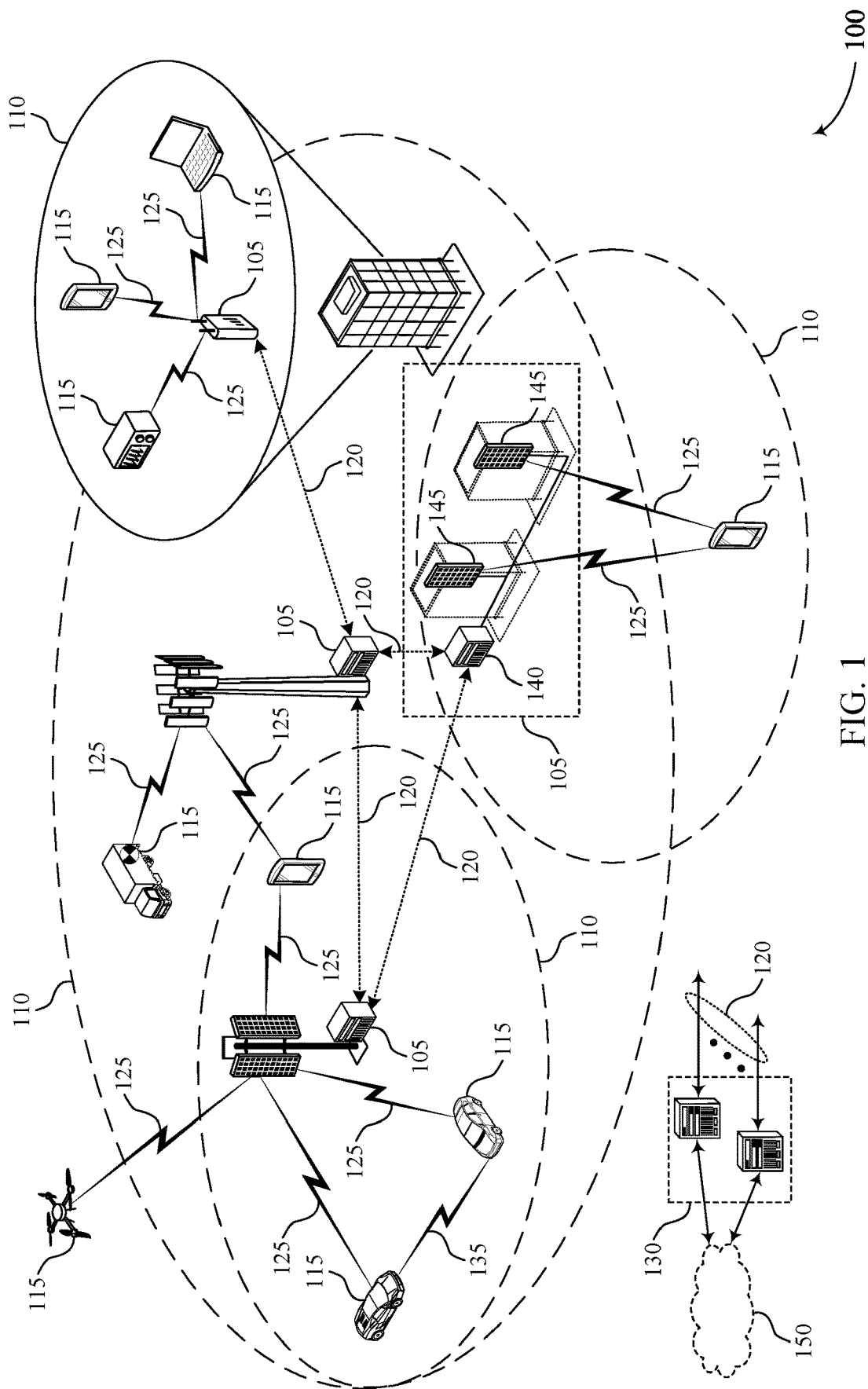
FIG. 1 illustrates an example of a wireless communications system that supports beam association for sidelink feedback in accordance with aspects of the present disclosure.

Some wireless communications systems may implement sidelink communications between devices such as user equipment (UE) to increase reliability and system throughput, and to reduce signaling overhead from the network perspective. In some cases, UEs may utilize beamforming techniques (e.g., spatial filtering or beam alignment) to compensate for reduced signal range or propagation associated with high frequency networks. For example, a transmitting UE may beamform in one or more directions to transmit sidelink data packets to a receiving UE within an angular or beam sweeping range.

In some cases, the transmitting UE may transmit multiple sidelink messages using one or more beams to a receiving UE. For example, the transmitting UE may transmit a first sidelink message using a first beam, and a second sidelink message using a second beam. The transmitting UE may then wait to receive feedback associated with the respective sidelink messages. In some cases, however, the feedback associated with both the first message and the second message may be mapped to the same physical sidelink feedback channel (PSFCH) time interval, and based on various beamforming constraints, the transmitting UE may not be able to successfully receive both feedback transmissions in the same time interval.

In such cases, the transmitting UE may use a number of different techniques to determine which feedback transmission to receive (e.g., feedback associated with the first sidelink message or feedback associated with the second sidelink message), and an associated receive beam with which to receive the selected feedback message. For example, the transmitting UE may reference a set of static rules that may indicate which feedback transmission to receive such as selection based on priority (e.g., the UE selects feedback associated with the highest priority transmission), latency requirements (e.g., the UE selects feedback associated with the transmission requiring the lowest latency), largest payload (e.g., the UE selects feedback associated with the transmission having the largest payload), or based on which transmission was transmitted the earliest. In some other examples, the receiver UE may select a transmit a beam for a feedback transmission based on an indication received in sidelink control information (SCI), a transmission and reception beam mapping received in control signaling, or other signaled indication. Upon signaling the beam association information in the SCI, the transmitting UE may receive feedback using a beam indicated in the SCI. Upon determining which feedback transmission to receive, and which receive beam to use, the UE may receive the feedback associated with either the first sidelink message or the second sidelink message, or both.

Aspects of the disclosure are initially described in the context of wireless communications systems. Aspects of the disclosure are further illustrated by and described with reference to apparatus diagrams, system diagrams, sidelink feedback configurations, a process flow, and flowcharts that relate to beam association for sidelink feedback.

FIG. 1 illustrates an example of a wireless communications system 100 that supports beam association for sidelink feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support sidelink communications between UE 115, and each UE 115 may utilize beamforming techniques to compensate for reduced signal range associated with high frequency bands used for communications. For example, a transmitting UE 115 may beamform in one or more directions to transmit sidelink data packets to a receiving UE 115. In some cases, the transmitting UE 115 may transmit multiple sidelink messages using multiple transmit beams to a receiving UE 115 and wait to receive feedback associated with the respective sidelink messages. In some cases, however, the feedback associated with both the first message and the second message may be mapped to the feedback channel time interval, and the transmitting UE 115 may not be able to successfully receive both feedback transmissions on the same time interval.

In such cases, the transmitting UE 115 may decide between which feedback transmission to receive (e.g., feedback associated with a first sidelink message or feedback associated with a second sidelink message), and an associated receive beam with which to receive the selected feedback message. For example, the transmitting UE 115 may reference a set of static rules that may indicate which feedback transmission to receive such as selection based on priority of the sidelink transmission, latency requirements, payload size, or based on which transmission was transmitted the earliest. In some other examples, the transmitting UE 115 may select a receive beam and indicate the received beam in the sidelink control information associated with the transmissions.

Figure 2:
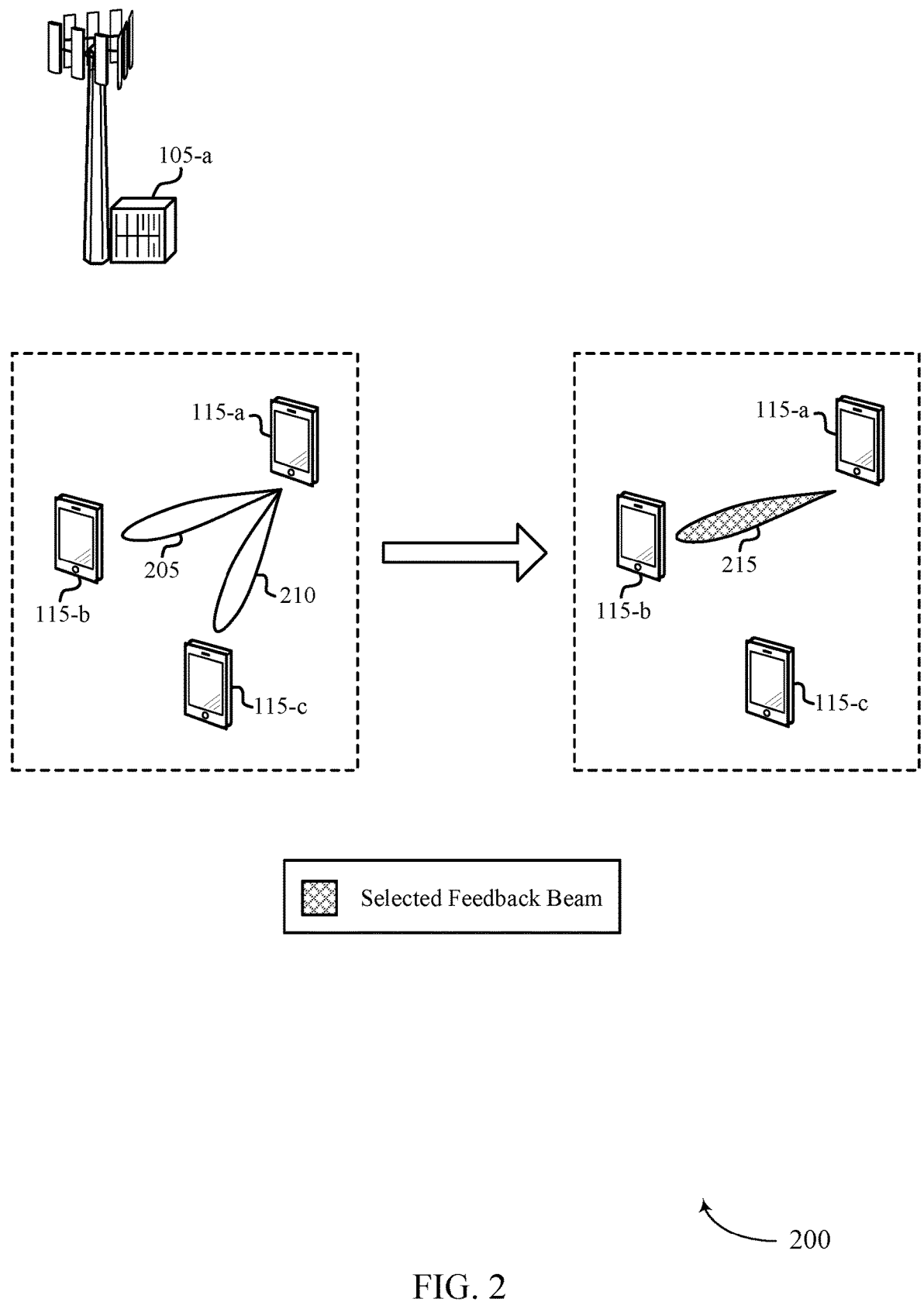
FIG. 2 illustrates an example of a wireless communications system that supports beam association for sidelink feedback in accordance with aspects of the present disclosure.

FIG. 2 illustrates an example of a wireless communications system 200 that supports beam association for sidelink feedback in accordance with aspects of the present disclosure. For example, wireless communications system 200 may support communications between a base station 105-a and UEs 115-a, 115-b, and 115-c, which may be examples of corresponding devices described with reference to FIG. 1.

Some wireless communications systems may support sidelink communications between UE to increase reliability and system throughput. In some cases, wireless devices that utilize sidelink communications may signal information over high frequency bands, such as millimeter wave (mmW) bands, corresponding to bandwidths between 6 GHz and 60 GHz. To account for increased pathloss associated with such high frequency communications, UEs may utilize beamforming techniques (e.g., spatial filtering or beam alignment) to compensate for reduced signal range or propagation, and to achieve high quality of service (QoS) targets established for the mmW system. For example, a transmitting UE may beamform in one or more directions at a time or may perform a beam sweeping procedure to transmit data packets within an angular range of the beam sweep. In response to the beam sweep, the receiving UE may receive the beams from a relatively narrow angular range (e.g., using spatial blindness). In some other cases in which the transmitting UE knows the direction of the receiving UE, the transmitting UE may use narrow directional beams to transmit the data packets to the receiving UE.

In some cases, the wireless communications system 200 may support different sidelink resource allocation modes. For example, mode 1 sidelink resource allocation may include resource allocation performed by the base station 105-a, which may transmit dynamic grants of sidelink resources to the UEs 115, as well as grants of periodic sidelink resources configured semi-statically by radio resource control (RRC) signaling. A dynamic sidelink grant downlink control information (DCI) may indicate resources for one or multiple transmissions of a transport block for sidelink resources, and such transmissions may be subject to feedback procedures.

Additionally or alternatively, the wireless communications system 200 may implement mode 2 sidelink resource allocation, which is based on UE autonomous selection. For example, a UE may be configured with a pre-configured resource pool, and may select sidelink resources of the resource pool. Sidelink UEs operating in accordance with mode 2 may transmit sidelink data and control signaling in a beam formed manner. For example, a transmitting UE may transmit a single beam for transmitting a unicast message to a receiving (e.g., peer) UE. For groupcast or broadcasts, the transmitting UE may cycle through multiple beams to transmit the packet across the entire angular range of the beams. A receiving UE may receive the sidelink packet using beams covering 360-degrees, for example, the receiving UE may sense all possible beam directions and exclude resources being used by other sidelink UEs during resources selection in mode 2.

In some cases, a first sidelink UE 115-a may transmit multiple sidelink messages using respective beams 205 and 210 to one or more secondary devices such as a receiving UEs 115-b and 115-c. For example, the sidelink UE 115-a may transmit a first message using a first beam 205, and a second message using a second beam 210. The UE 115-a may then wait to receive feedback associated with the sidelink messages sent using beams 205 and 210. In some cases, however, the feedback associated with both the first message and the second message may be mapped to the same PSFCH time interval such that the UE 115-a may not be able to successfully receive both feedback transmissions.

In such cases, the UE 115-a may decide which feedback transmission to receive (e.g., feedback associated with the first message or feedback associated with the second message), and an associated receive beam 215 or 220 with which to receive the selected feedback message. The UE 115-a may implement a number of different techniques to determine which feedback message to receive, and which associated receive beam to use. For example, the UEs 115 may reference a set of static rules that may indicate which feedback transmission to receive such as selection based on priority, latency requirements, largest payload, or based on which transmission was transmitted the earliest. For example, each UE in the wireless communications system 200 (e.g., UE 115-a, UE 115-b, and UE 115-c) may be aware of the static rules, and the UEs may each select feedback transmission and reception beams based on referencing the static rules. In some other examples, the UE 115-a may indicate the receive beam that the UE 115-b may use for receiving the feedback transmission, a transmission and reception beam mapping, or other indication. Upon receiving the indication for which receive beam to use for receiving feedback, the UE 115-b may select the determined beam (e.g., beam 215) to receive the feedback from the UE 115-a.

Figure 3:
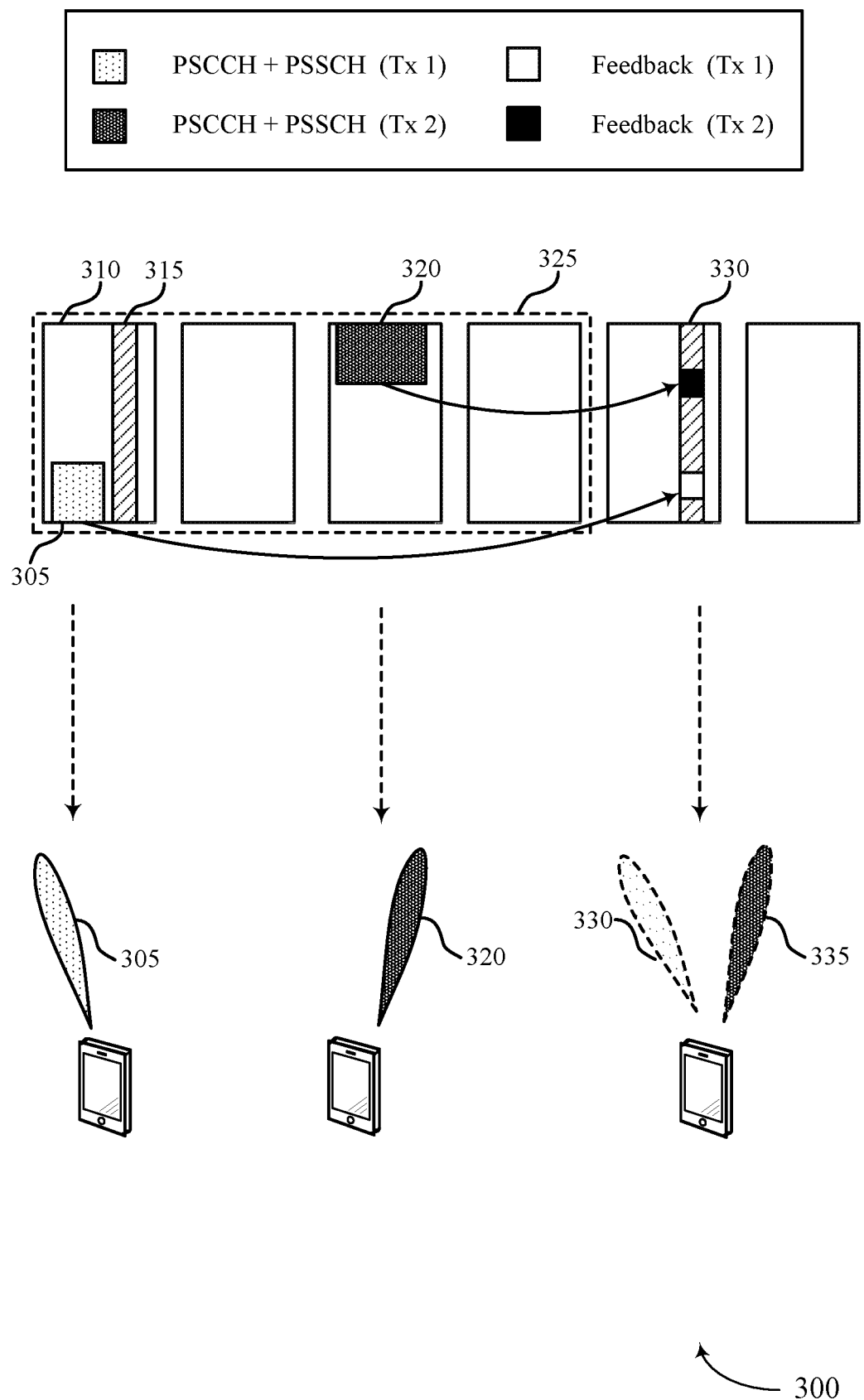
FIGS. 3 and 4 illustrate examples of sidelink feedback configurations that support beam association for sidelink feedback in accordance with aspects of the present disclosure.

FIG. 3 illustrates an example of a sidelink feedback configuration 300 that supports beam association for sidelink feedback in accordance with aspects of the present disclosure. For example, sidelink feedback configuration may implement or be implemented by one or more sidelink UEs operating in a wireless communications system, which may be examples of UE described with reference to FIGS. 1 and 2.

Sidelink feedback configuration 300 may include sidelink resources on a number of slots of a sidelink channel. For example, a first UE may transmit a physical sidelink control channel (PSCCH) and physical sidelink shared channel (PSSCH) transmission 305 in a first slot 310 to a second UE. In some cases, the first slot 310 may also be a slot associated with PSFCH time interval such that the first UE may transmit feedback using the allocated resources (e.g., in accordance with mode 2 sidelink). Feedback slots may be present every 1, 2, or 4 slots, or a different configurable number of slots. In some examples, the feedback time interval may be mapped based on source and destination ID and the time-frequency location of the transmitted packet. The first UE may also transmit a second PSCCH and PSSCH transmission 320 within the feedback TTI bundle 325.

A receiver UE (e.g., a second UE) that receives a beamformed transmission 305 or 320 from the first UE using a receive beam may similarly transmit the feedback on the same beam direction. The first UE (e.g., the transmitter UE or transmission source) may receive feedback using wide beams, however, wide beam reception may impact the range of PSFCH transmissions so the first UE may in some examples receive PSFCH using a beam 330 or 335. In some cases, two or more feedback transmissions may be mapped to the same PSFCH TTI or the same feedback time interval in the same PSFCH slot, and even if the feedbacks map to different resource blocks and sequences, the first UE may select between beams 330 and 335 to listen for feedback. For example, in cases where the first UE may perform analog beamforming for beams in one of the directions of feedback (but not both), the first UE may select one of the beams for receiving feedback. In some other cases, the first UE may make a single transmission every feedback TTI bundle. In either case, the first UE may implement a number of techniques to determine which direction feedback is transmitted and which receive beam to use for receiving feedback.

For example, the first UE may evaluate one or more static rules to select which direction feedback is transmitted. In some implementations, the first UE may beamform and listen for the feedback of the transmission with highest priority (e.g., the first UE may listen for feedback associated with transmission 305 or 320 on beams 330 or 335, respectively, based on whichever of the two transmissions has the highest priority). In some other implementations, the first UE may beamform and listen for the feedback of the transmission with highest latency requirements (e.g., the first UE may listen for feedback associated with transmission 305 or 320 on beams 330 or 335, respectively, based on whichever of the two transmissions is specified as lowest latency). In some other implementations, the first UE may beamform and listen for the feedback of the transmission with the largest payload (e.g., the first UE may listen for feedback associated with transmission 305 or 320 on beams 330 or 335, respectively, based on whichever of the two transmissions has the largest sidelink payload). In some other implementations, the first UE may beamform and listen for the feedback of the transmission that was transmitted earliest (e.g., the first UE may listen for feedback associated with transmission 305 on beam 330 because the transmission 305 is transmitted before transmission 320). In some cases, the first UE may implement a combination of static rules in order to determine a direction to listen for feedback. The first UE may also attempt to decode feedback messages (e.g., ACK/NACK) not only on the prioritized resource but on all resources mapped to its transmissions.

A receiving UE or a second UE which receives one or more transmissions from the first UE may use the static rules to determine which direction is the most probable direction that the transmitting UE will listen for feedback on during the PSFCH occasion. If the second UE uses multiple wide beams for reception, it may select the beam, antenna panel, or sector to transmit the feedback for the data packet transmitted from the first UE. In some cases, the second UE may not send feedback if none of the packets received by the second UE were intended for the second UE (e.g., based on decoded SCI). In some other cases, if the second UE receives multiple packets and a packet with lower priority is the packet intended for the second UE and a packet with higher feedback priority is received, the second UE may transmit the feedback for the lower priority packet with a precoder associated with the higher priority packet.

In some other cases, the first UE may select which direction feedback is transmitted and an associated receive beam based on packets received (e.g., via the PSCCH). For example, the first UE may indicate PSFCH beam association (e.g., a transmission-reception beam correspondence) among different transmitted packets. In such cases, control signaling may indicate the receiver beam for transmitting feedback.

Figure 4:
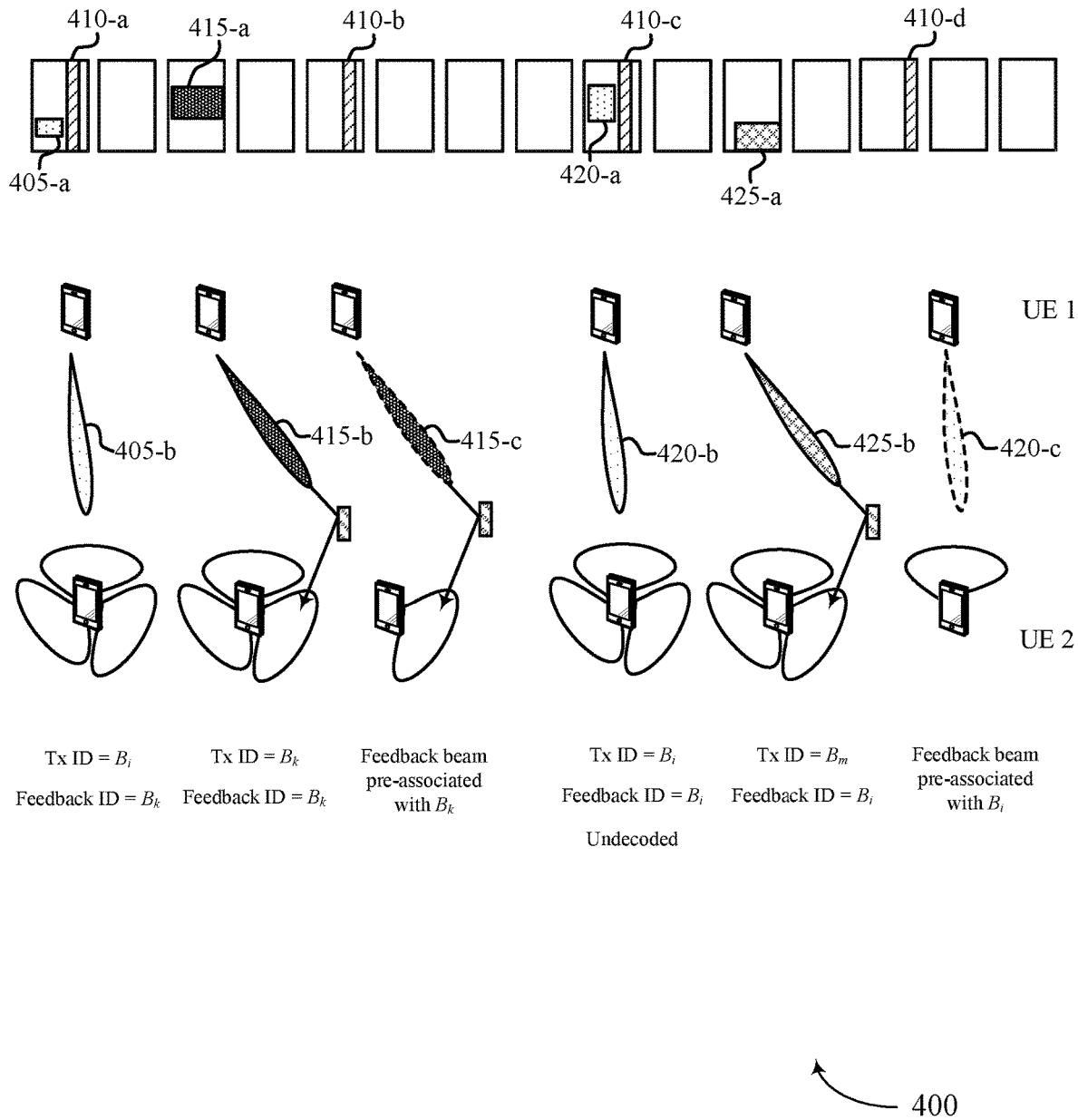

FIG. 4 illustrates an example of a sidelink feedback configuration 400 that supports beam association for sidelink feedback in accordance with aspects of the present disclosure. For example, sidelink feedback configuration may implement or be implemented by one or more sidelink UEs operating in a wireless communications system, which may be examples of UE described with reference to FIGS. 1-3.

In some cases, two or more feedback transmissions may be mapped to the same PSFCH TTI or the same feedback time interval 410 in the same PSFCH slot, and a UE may select between different receive beams to listen for feedback. In some examples, the UE may use a beam association included in control signaling to determine which direction feedback is transmitted and which receive beam to use for receiving feedback. For example, a transmitting UE may indicate a PSFCH beam association among different packets to determine which feedback beams to use in a control message such as a sidelink control information message.

In some examples, a sidelink control information message may include an indication for the transmitter beam (e.g., a transmission configuration indicator (TCI) state or precoder index/ID) for the current transmission (e.g., Tx beam ID). In addition, the sidelink control information may include an indication for the receiver beam (e.g., TCI-state or precoder index/ID) for transmitting the feedback for the received packet (e.g., feedback beam ID). The transmission (Tx) beam ID and the feedback beam ID may be associated in various ways, which may be conveyed via control signaling.

For example, in some cases, if the Tx beam ID ($B_i$) and the feedback beam ID (BD are the same (e.g., for Tx-Rx pairs 415 and 420), the UE may transmit feedback with the same beam that the transmission was received on.

In some other cases, if the Tx beam ID (BD and the feedback beam ID ($B_k$) are not same (e.g., Tx-Rx beam pairs 405 and 420), the UE may transmit feedback using a different beam than the transmission was received on. Additionally or alternatively, if another packet is received with Tx beam ID ($B_k$), the receiving UE may transmit the feedback using the beam associated with this second packet. In some other cases, the UE does not receive a packet with Tx beam ID ($B_k$). In such cases, the UE may transmit feedback with beam corresponding to $B_i$, or the UE may refrain from sending feedback.

In some cases, the Tx-Rx beam correspondence may be a mapping between Tx beam ID (e.g., signaled to the UE) and Rx beam ID (e.g., an ID internal to the receiver of the UE). For a given source (Tx) UE, a receiver (Rx) UE may maintain the Tx-Rx beam correspondence for a configurable amount of time, and the UE may receive updates to the Tx-Rx beam correspondence via control signaling, or beams may be updated for a Tx beam ID when a packet is received on a different Rx beam, sector, or antenna panel of the UE. In some cases, the Tx-Rx beam correspondence may expire, or may be erased based on a timer, or on indication from a peer (e.g., RRC signaling).

Figure 5:
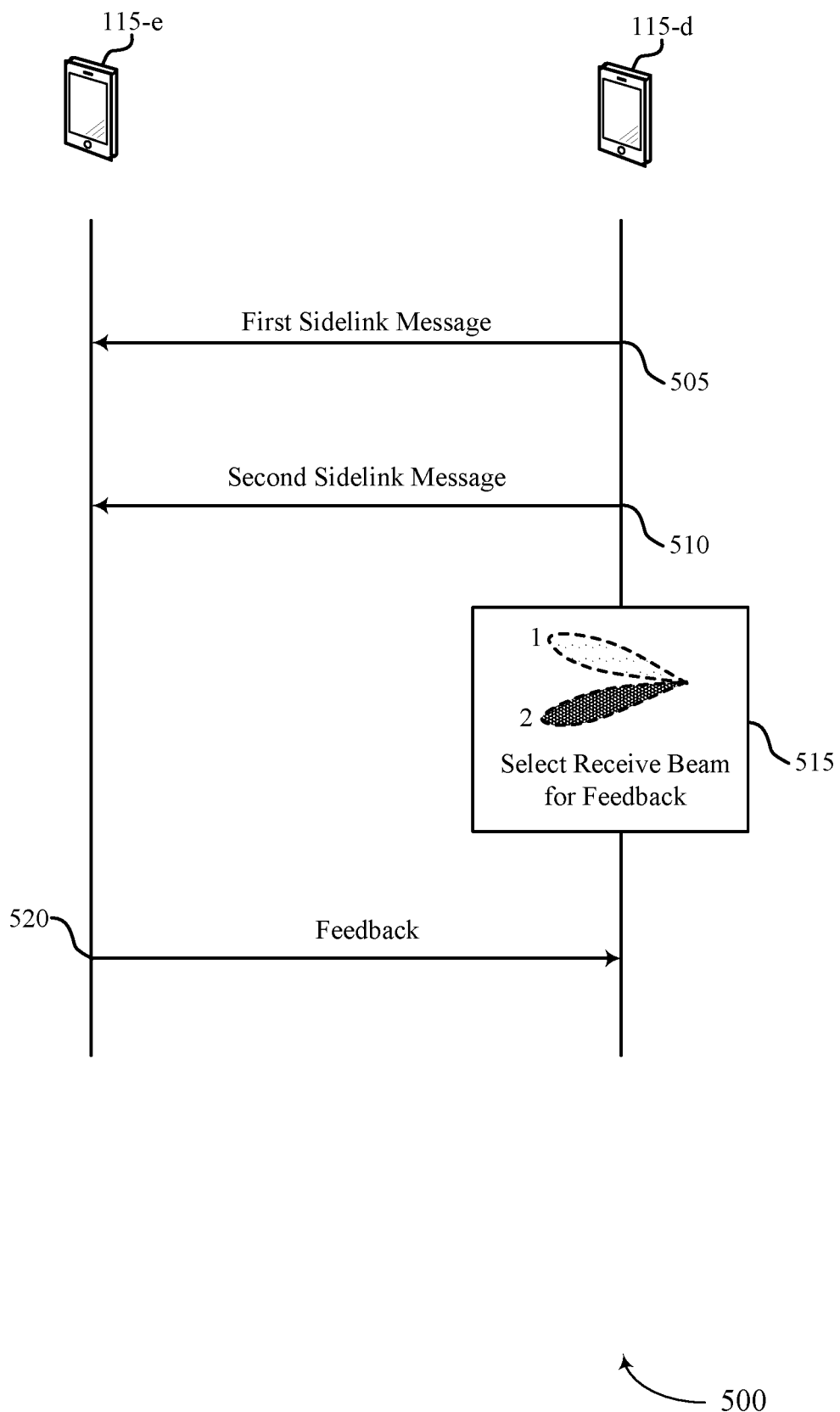
FIG. 5 illustrates an example of a process flow that supports beam association for sidelink feedback in accordance with aspects of the present disclosure.

FIG. 5 illustrates an example of a process flow 500 that supports beam association for sidelink feedback in accordance with aspects of the present disclosure. The process flow 500 may implement aspects of wireless communications systems 100-400, or may be implemented by aspects of the wireless communications system 100-400. For example, the process flow 500 may illustrate operations between sidelink UEs 115-d and 115-e, which may be examples of corresponding devices described with reference to FIGS. 1-4. In the following description of the process flow 500, the operations between the UE 115-d and 115-e may be transmitted in a different order than the example order shown, or the operations performed by the UE 115-d and 115-e may be performed in different orders or at different times. Some operations may also be omitted from the process flow 500, and other operations may be added to the process flow 500.

At 505, the UE 115-d may transmit a first sidelink message using a first beam, the first sidelink message corresponding to a feedback time interval for receiving feedback for the first sidelink message. In some cases, the UE 115-d may transmit the first sidelink message in a first TTI of a feedback transmission TTI.

At 510, the UE 115-d may transmit a second sidelink message using a second beam that is different from the first beam, the second sidelink message corresponding to the feedback time interval for receiving feedback for the first sidelink message and for the second sidelink message.

At 515, the UE 115-d may select (e.g., from the first beam or the second beam) a receive beam for receiving feedback from the UE 115-e during the feedback time interval. In some cases, the UE 115-d may select the receive beam based on evaluating one or more static rules from a set of rules for receiving the feedback. For example, in some cases, a rule may be a priority rule. The UE 115-*d* may determine a first priority associated with the first sidelink message and a second priority associated with the second sidelink message, and may select a receive beam based on whichever sidelink message has the highest priority.

In some other cases, the rule may be a payload rule, and the UE 115-*d* may determine a first payload associated with the first sidelink message and a second payload associated with the second sidelink message. In such cases, the UE 115-*d* may select a receive beam based on whichever sidelink message has the largest payload.

In some other cases, the rule may be a transmission timing rule, and the UE 115-*d* may determine a time at which the first sidelink message was transmitted and a second time at which the second sidelink message was transmitted. In such cases, the UE 115-*d* may select a receive beam based on whichever sidelink message was transmitted the earliest.

In some other implementations, the UE 115-*d* may indicate a selected receive beam to the UE 115-*e* via control signaling. For example, the UE 115-*d* may transmit an indication of a transmission beam used to transmit the first sidelink message, the second sidelink message, or both via sidelink control information to the UE 115-*e*. The UE 115-*d* may then transmit an indication of the selected receive beam used to receive the feedback associated with the first sidelink message, the second sidelink message, or both. In some cases, the indication of the transmission beam or the reception beam may be a TCI state, a precoder index, a precoder identifier, a transmit beam ID, a feedback beam ID, or any combination thereof.

In cases that the indication of the transmission beam is a transmission beam ID and the indication of the receive beam is a feedback beam ID, the UE 115-*d* may receive the feedback using a receive beam whose transmission beam ID is the same as the feedback beam ID of the feedback (e.g., the UE 115-*d* may receive feedback on the same beam that it transmitted the original sidelink message). In some other cases, the transmission beam ID may be different than the feedback beam ID. In some cases, the UE 115-*d* may determine a mapping or a correspondence between the transmission beam ID and the feedback beam using a transmission-reception beam pair included in sidelink control information. The UE 115-*d* may maintain the mapping of the transmission-reception beam pair for a configurable amount of time, for example, a time duration indicated by a timer.

In some cases, the UE 115-*d* may modify the mapping between the transmission beam and the receive beam based on receiving an indication to change the mapping (e.g., via sidelink control signaling) or based on receiving feedback on a different beam.

At 520, the UE 115-*d* may monitor for feedback (e.g., associated with the first sidelink message, the second sidelink message, or both) from the UE 115-*e* using the selected receive beam.

Figure 6:
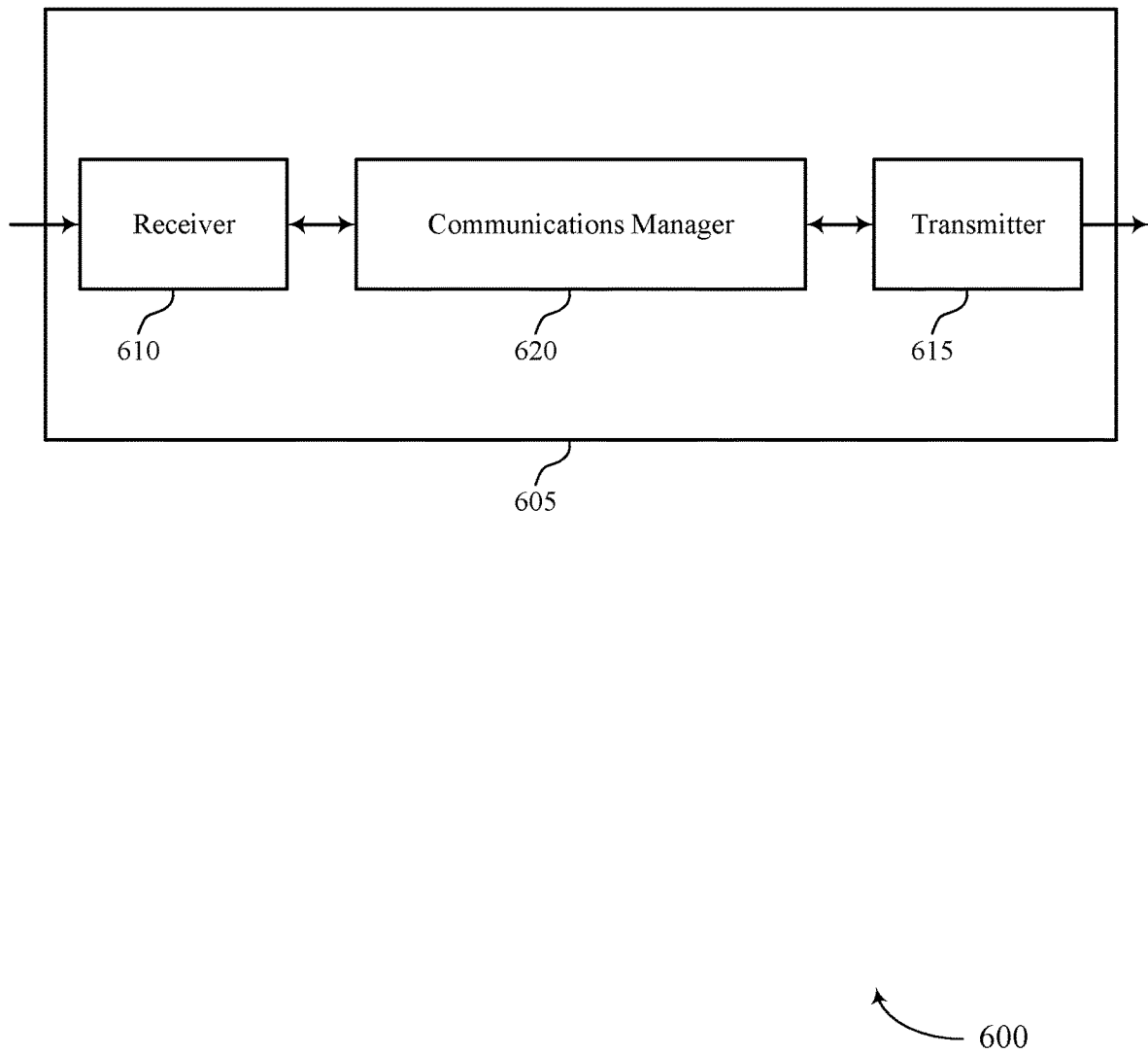
FIGS. 6 and 7 show block diagrams of devices that support beam association for sidelink feedback in accordance with aspects of the present disclosure.

FIG. 6 shows a block diagram 600 of a device 605 that supports beam association for sidelink feedback in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam association for sidelink feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam association for sidelink feedback). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam association for sidelink feedback as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for transmitting a first sidelink message using a first beam of the first UE, the first sidelink message corresponding to a feedback time interval for feedback for the first sidelink message. The communications manager 620 may be configured as or otherwise support a means for transmitting a second sidelink message using a second beam of the first UE that is different from the first beam, the second sidelink message corresponding to the feedback time interval for feedback for the first sidelink message and for the second sidelink message. The communications manager 620 may be configured as or otherwise support a means for selecting, from one of the first beam or the second beam, a receive beam for receiving feedback during the feedback time interval. The communications manager 620 may be configured as or otherwise support a means for monitoring for feedback using the selected receive beam, where the feedback is associated with the first sidelink message, the second sidelink message, or both.

Additionally or alternatively, the communications manager 620 may support wireless communications at a second UE in accordance with examples as disclosed herein. For example, the communications manager 620 may be configured as or otherwise support a means for receiving a first sidelink message using a first beam of the second UE, the first sidelink message corresponding to a feedback time interval for feedback for the first sidelink message. The communications manager 620 may be configured as or otherwise support a means for receiving a second sidelink message using a second beam of the second UE that is different from the first beam, the second sidelink message corresponding to the feedback time interval for feedback for the first sidelink message and for the second sidelink message. The communications manager 620 may be configured as or otherwise support a means for selecting, from one of the first beam or the second beam, a transmission beam for transmitting feedback during the feedback time interval. The communications manager 620 may be configured as or otherwise support a means for transmitting feedback to a first UE using the selected transmission beam, where the feedback is associated with the first sidelink message, the second sidelink message, or both.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication and beam sweeping resources.

Figure 7:
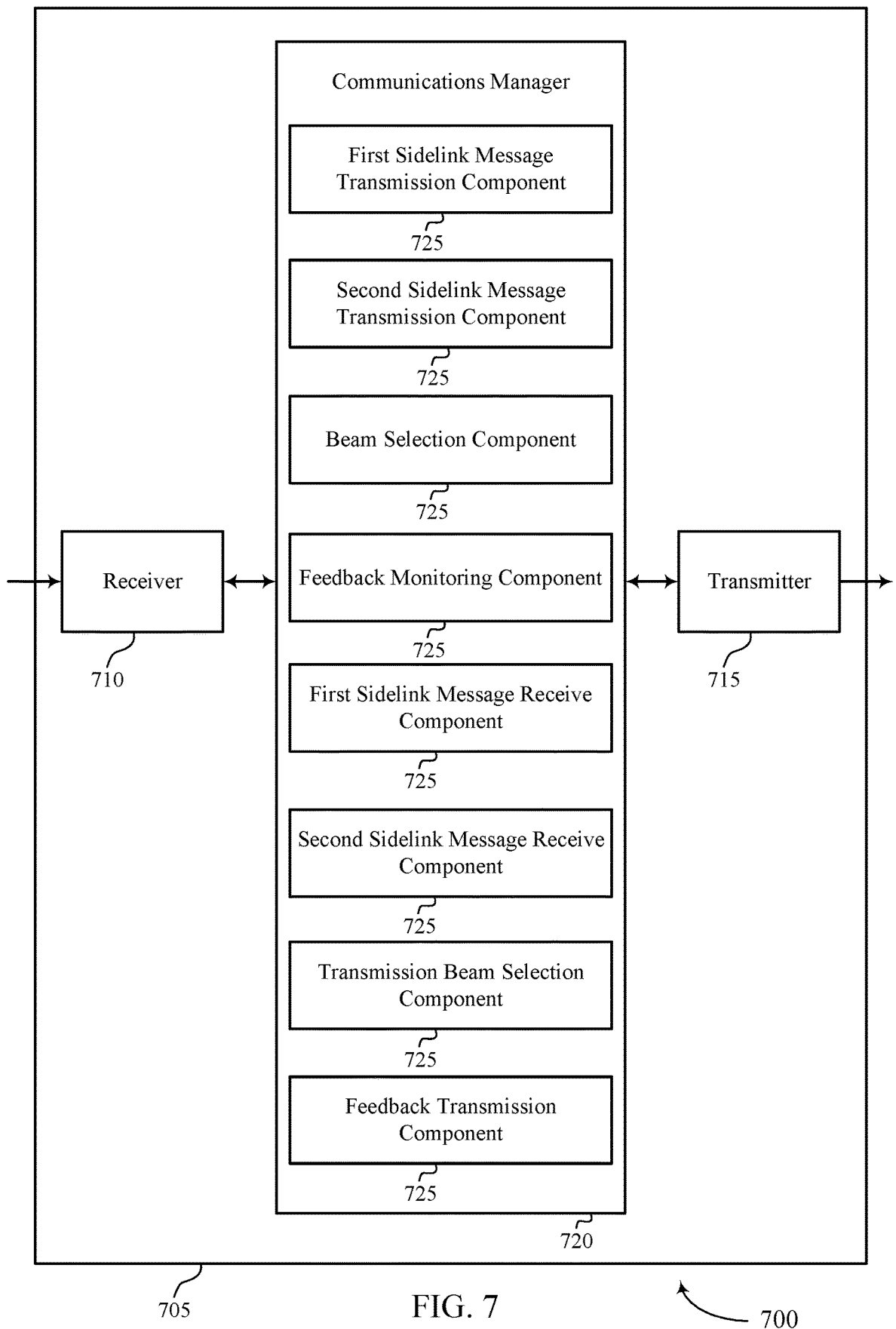

FIG. 7 shows a block diagram 700 of a device 705 that supports beam association for sidelink feedback in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam association for sidelink feedback). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam association for sidelink feedback). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam association for sidelink feedback as described herein. For example, the communications manager 720 may include a first sidelink message transmission component 725, a second sidelink message transmission component 730, a beam selection component 735, a feedback monitoring component 740, a first sidelink message receive component 745, a second sidelink message receive component 750, a transmission beam selection component 755, a feedback transmission component 760, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The first sidelink message transmission component 725 may be configured as or otherwise support a means for transmitting a first sidelink message using a first beam of the first UE, the first sidelink message corresponding to a feedback time interval for feedback for the first sidelink message. The second sidelink message transmission component 730 may be configured as or otherwise support a means for transmitting a second sidelink message using a second beam of the first UE that is different from the first beam, the second sidelink message corresponding to the feedback time interval for feedback for the first sidelink message and for the second sidelink message. The beam selection component 735 may be configured as or otherwise support a means for selecting, from one of the first beam or the second beam, a receive beam for receiving feedback during the feedback time interval. The feedback monitoring component 740 may be configured as or otherwise support a means for monitoring for feedback using the selected receive beam, where the feedback is associated with the first sidelink message, the second sidelink message, or both.

Additionally or alternatively, the communications manager 720 may support wireless communications at a second UE in accordance with examples as disclosed herein. The first sidelink message receive component 745 may be configured as or otherwise support a means for receiving a first sidelink message using a first beam of the second UE, the first sidelink message corresponding to a feedback time interval for feedback for the first sidelink message. The second sidelink message receive component 750 may be configured as or otherwise support a means for receiving a second sidelink message using a second beam of the second UE that is different from the first beam, the second sidelink message corresponding to the feedback time interval for feedback for the first sidelink message and for the second sidelink message. The transmission beam selection component 755 may be configured as or otherwise support a means for selecting, from one of the first beam or the second beam, a transmission beam for transmitting feedback during the feedback time interval. The feedback transmission component 760 may be configured as or otherwise support a means for transmitting feedback to a first UE using the selected transmission beam, where the feedback is associated with the first sidelink message, the second sidelink message, or both.

Figure 8:
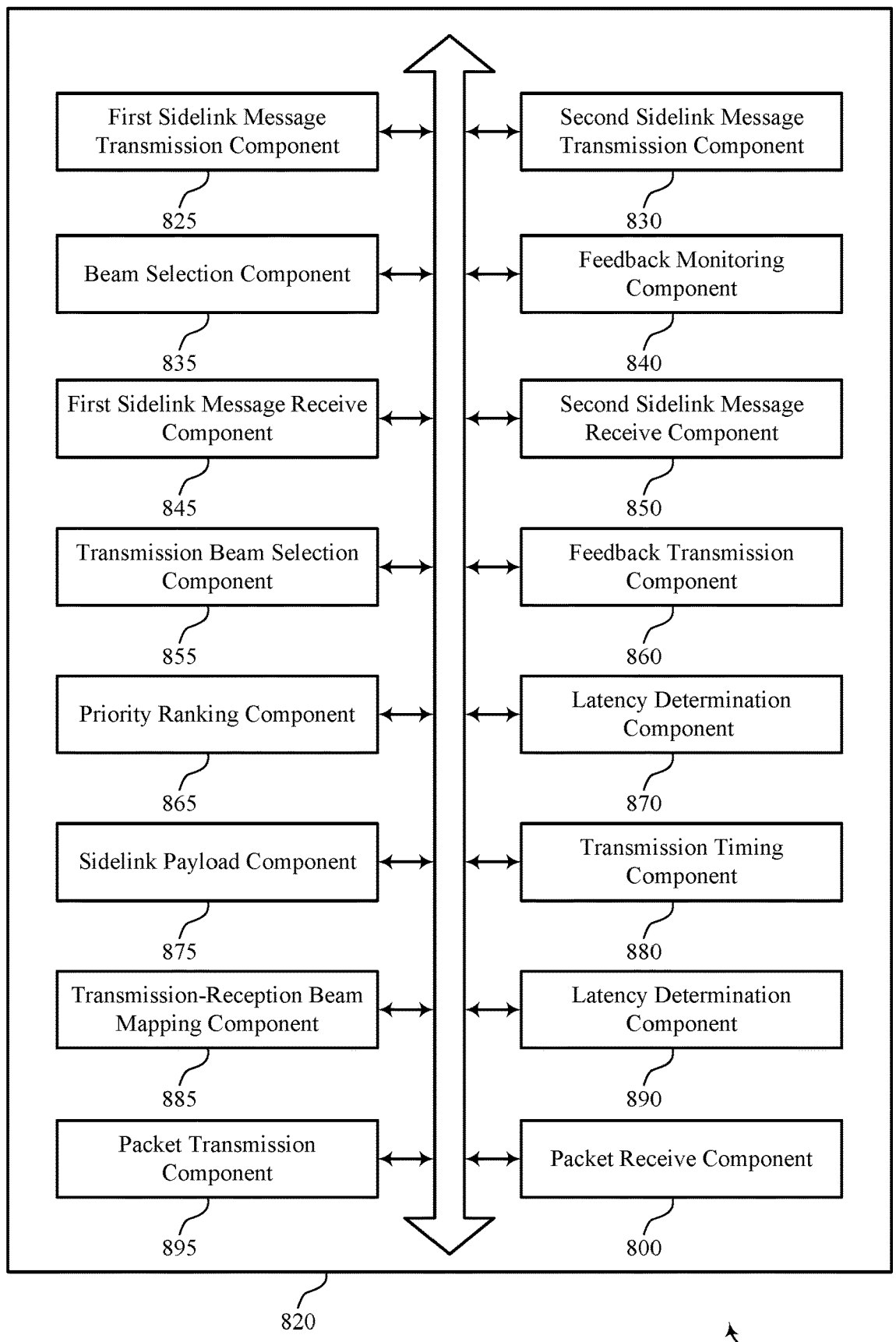
FIG. 8 shows a block diagram of a communications manager that supports beam association for sidelink feedback in accordance with aspects of the present disclosure.

FIG. 8 shows a block diagram 800 of a communications manager 820 that supports beam association for sidelink feedback in accordance with aspects of the present disclosure. The communications manager 820 may be an example of aspects of a communications manager 620, a communications manager 720, or both, as described herein. The communications manager 820, or various components thereof, may be an example of means for performing various aspects of beam association for sidelink feedback as described herein. For example, the communications manager 820 may include a first sidelink message transmission component 825, a second sidelink message transmission component 830, a beam selection component 835, a feedback monitoring component 840, a first sidelink message receive component 845, a second sidelink message receive component 850, a transmission beam selection component 855, a feedback transmission component 860, a priority ranking component 865, a latency determination component 870, a sidelink payload component 875, a transmission timing component 880, a transmission-reception beam mapping component 885, a latency determination component 890, a packet transmission component 895, a packet receive component 8100, or any combination thereof. Each of these components may communicate, directly or indirectly, with one another (e.g., via one or more buses).

The communications manager 820 may support wireless communications at a first UE in accordance with examples as disclosed herein. The first sidelink message transmission component 825 may be configured as or otherwise support a means for transmitting a first sidelink message using a first beam of the first UE, the first sidelink message corresponding to a feedback time interval for feedback for the first sidelink message. The second sidelink message transmission component 830 may be configured as or otherwise support a means for transmitting a second sidelink message using a second beam of the first UE that is different from the first beam, the second sidelink message corresponding to the feedback time interval for feedback for the first sidelink message and for the second sidelink message. The beam selection component 835 may be configured as or otherwise support a means for selecting, from one of the first beam or the second beam, a receive beam for receiving feedback during the feedback time interval. The feedback monitoring component 840 may be configured as or otherwise support a means for monitoring for feedback using the selected receive beam, where the feedback is associated with the first sidelink message, the second sidelink message, or both.

In some examples, the beam selection component 835 may be configured as or otherwise support a means for selecting the receive beam based on one or more rules of a set of rules for receiving the feedback associated with the first sidelink message, the second sidelink message, or both.

In some examples, the one or more rules includes a priority rule, and the priority ranking component 865 may be configured as or otherwise support a means for determining a first priority associated with the first sidelink message and a second priority associated with the second sidelink message. In some examples, the one or more rules includes a priority rule, and the beam selection component 835 may be configured as or otherwise support a means for selecting the receive beam associated with the first sidelink message or the second sidelink message based on the priority rule, where the priority rule indicates that the receive beam is associated with the sidelink message having the highest priority.

In some examples, the one or more rules includes a latency rule, and the latency determination component 870 may be configured as or otherwise support a means for determining a first latency target associated with the first sidelink message and a second latency target associated with the second sidelink message. In some examples, the one or more rules includes a latency rule, and the beam selection component 835 may be configured as or otherwise support a means for selecting the receive beam associated with the first sidelink message or the second sidelink message based on the latency rule, where the latency rule indicates that the receive beam is associated with the sidelink message having the lowest latency target.

In some examples, the one or more rules includes a payload rule, and the sidelink payload component 875 may be configured as or otherwise support a means for determining a first payload associated with the first sidelink message and a second payload associated with the second sidelink message. In some examples, the one or more rules includes a payload rule, and the beam selection component 835 may be configured as or otherwise support a means for selecting the receive beam associated with the first sidelink message or the second sidelink message based on the payload rule, where the payload rule indicates that the receive beam is associated with the sidelink message having the largest payload.

In some examples, the one or more rules includes a transmission timing rule, and the transmission timing component 880 may be configured as or otherwise support a means for determining a transmission time for the first sidelink message and a second time of transmission for the second sidelink message. In some examples, the one or more rules includes a transmission timing rule, and the beam selection component 835 may be configured as or otherwise support a means for selecting the receive beam associated with the first sidelink message or the second sidelink message based on the transmission timing rule, where the transmission timing rule indicates that the receive beam is associated with the sidelink message having an earliest transmission time.

In some examples, the beam selection component 835 may be configured as or otherwise support a means for transmitting, to a second UE via sidelink control information, an indication of a transmission beam used to transmit the first sidelink message, the second sidelink message, or both. In some examples, the beam selection component 835 may be configured as or otherwise support a means for transmitting, to a second UE via sidelink control information, an indication of the selected receive beam used to receive the feedback associated with the first sidelink message, the second sidelink message, or both.

In some examples, the indication of the transmission beam includes a transmission configuration indicator state, a precoder index, a precoder identifier, a transmit beam identifier, or any combination thereof.

In some examples, the indication of the receive beam includes a transmission configuration indicator state, a precoder index, a precoder identifier, a feedback beam identifier, or any combination thereof.

In some examples, the indication of the transmission beam includes a transmission beam identifier and the indication of the receive beam includes a feedback beam identifier, and the feedback monitoring component 840 may be configured as or otherwise support a means for receiving the feedback using the receive beam, where a direction of the selected receive beam is the same as a direction of the transmission beam based on the transmission beam identifier being the same as the feedback beam identifier.

In some examples, the indication of the transmission beam includes a transmission beam identifier and the indication of the receive beam includes a feedback beam identifier, and the feedback monitoring component 840 may be configured as or otherwise support a means for receiving the feedback using the receive beam, where a direction of the selected receive beam is different from the transmission beam based on the transmission beam identifier being different from the feedback beam identifier.

In some examples, the packet transmission component 895 may be configured as or otherwise support a means for transmitting a packet on a beam associated with the transmission beam identifier. In some examples, the feedback monitoring component 840 may be configured as or otherwise support a means for receiving the feedback using the beam that the packet was transmitted on.

In some examples, the feedback monitoring component 840 may be configured as or otherwise support a means for receiving the feedback using a beam corresponding to the transmission beam identifier.

In some examples, the transmission-reception beam mapping component 885 may be configured as or otherwise support a means for determining a mapping between the transmission beam and the receive beam, where the mapping indicates a transmission-reception beam pair in accordance with the sidelink control information.

In some examples, the transmission-reception beam mapping component 885 may be configured as or otherwise support a means for maintaining the mapping between the transmission beam and the receive beam for a time duration indicated by a timer.

In some examples, the feedback monitoring component 840 may be configured as or otherwise support a means for receiving the feedback on a beam different than the receive beam indicated by the mapping. In some examples, the transmission-reception beam mapping component 885 may be configured as or otherwise support a means for modifying the mapping between the transmission beam and the receive beam based on receiving the feedback on the different beam.

In some examples, the transmission-reception beam mapping component 885 may be configured as or otherwise support a means for receiving, via control signaling, an indication to change the mapping between the transmission beam and the receive beam.

In some examples, the first sidelink message transmission component 825 may be configured as or otherwise support a means for transmitting the first sidelink message in a first transmission time interval of a feedback transmission time interval bundle.

Additionally or alternatively, the communications manager 820 may support wireless communications at a second UE in accordance with examples as disclosed herein. The first sidelink message receive component 845 may be configured as or otherwise support a means for receiving a first sidelink message using a first beam of the second UE, the first sidelink message corresponding to a feedback time interval for feedback for the first sidelink message. The second sidelink message receive component 850 may be configured as or otherwise support a means for receiving a second sidelink message using a second beam of the second UE that is different from the first beam, the second sidelink message corresponding to the feedback time interval for feedback for the first sidelink message and for the second sidelink message. The transmission beam selection component 855 may be configured as or otherwise support a means for selecting, from one of the first beam or the second beam, a transmission beam for transmitting feedback during the feedback time interval. The feedback transmission component 860 may be configured as or otherwise support a means for transmitting feedback to a first UE using the selected transmission beam, where the feedback is associated with the first sidelink message, the second sidelink message, or both.

In some examples, the feedback transmission component 860 may be configured as or otherwise support a means for transmitting the transmission beam based on one or more rules of a set of rules the first UE implements for receiving the feedback associated with the first sidelink message, the second sidelink message, or both.

In some examples, the one or more rules includes a priority rule, and the priority ranking component 865 may be configured as or otherwise support a means for determining a first priority associated with the first sidelink message and a second priority associated with the second sidelink message. In some examples, the one or more rules includes a priority rule, and the transmission beam selection component 855 may be configured as or otherwise support a means for selecting the transmission beam associated with the first sidelink message or the second sidelink message based on the priority rule, where the priority rule indicates that the receive beam selected by the first UE is associated with the sidelink message having the highest priority.

In some examples, the one or more rules includes a latency rule, and the latency determination component 890 may be configured as or otherwise support a means for determining a first latency target associated with the first sidelink message and a second latency target associated with the second sidelink message. In some examples, the one or more rules includes a latency rule, and the transmission beam selection component 855 may be configured as or otherwise support a means for selecting the transmission beam associated with the first sidelink message or the second sidelink message based on the latency rule, where the latency rule indicates that the receive beam selected by the first UE is associated with the sidelink message having the lowest latency target.

In some examples, the one or more rules includes a payload rule, and the sidelink payload component 875 may be configured as or otherwise support a means for determining a first payload associated with the first sidelink message and a second payload associated with the second sidelink message. In some examples, the one or more rules includes a payload rule, and the transmission beam selection component 855 may be configured as or otherwise support a means for selecting the transmission beam associated with the first sidelink message or the second sidelink message based on the payload rule, where the payload rule indicates that the receive beam selected by the first UE is associated with the sidelink message having the largest payload.

In some examples, the one or more rules includes a transmission timing rule, and the transmission timing component 880 may be configured as or otherwise support a means for determining a first transmission time for the first sidelink message and a second time of transmission for the second sidelink message. In some examples, the one or more rules includes a transmission timing rule, and the transmission beam selection component 855 may be configured as or otherwise support a means for selecting the transmission beam associated with the first sidelink message or the second sidelink message based on the transmission timing rule, where the transmission timing rule indicates that the receive beam is associated with the sidelink message having an earliest transmission time.

In some examples, the beam selection component 835 may be configured as or otherwise support a means for receiving, from the first UE via sidelink control information, an indication of a receive beam for receiving the first sidelink message, the second sidelink message, or both. In some examples, the beam selection component 835 may be configured as or otherwise support a means for receiving, from the first UE via sidelink control information, an indication of the transmission beam for transmitting the feedback associated with the first sidelink message, the second sidelink message, or both.

In some examples, the indication of the transmission beam includes a transmission configuration indicator state, a precoder index, a precoder identifier, a transmit beam identifier, or any combination thereof.

In some examples, the indication of the receive beam includes a transmission configuration indicator state, a precoder index, a precoder identifier, a feedback beam identifier, or any combination thereof.

In some examples, the indication of the receive beam includes a transmission beam identifier and the indication of the transmission beam includes a feedback beam identifier, and the feedback transmission component 860 may be configured as or otherwise support a means for transmitting the feedback using the transmission beam, where the transmission beam is the same as the receive beam based on the transmission beam identifier being the same as the feedback beam identifier.

In some examples, the indication of the receive beam includes a transmission beam identifier and the indication of the transmission beam includes a feedback beam identifier, and the feedback transmission component 860 may be configured as or otherwise support a means for transmitting the feedback using the transmission beam, where the transmission beam is different from the receive beam based on the transmission beam identifier being different from the feedback beam identifier.

In some examples, the packet receive component 8100 may be configured as or otherwise support a means for receiving a packet on a beam associated with the transmission beam identifier. In some examples, the feedback transmission component 860 may be configured as or otherwise support a means for transmitting the feedback using the beam that the packet was received on.

In some examples, the feedback transmission component 860 may be configured as or otherwise support a means for transmitting the feedback using a beam corresponding to the transmission beam identifier.

In some examples, the transmission-reception beam mapping component 885 may be configured as or otherwise support a means for determining a mapping between the transmission beam and the receive beam, where the mapping indicates a transmission-reception beam pair in accordance with the sidelink control information.

In some examples, the transmission-reception beam mapping component 885 may be configured as or otherwise support a means for maintaining the mapping between the transmission beam and the receive beam for a time duration indicated by a timer.

In some examples, the feedback transmission component 860 may be configured as or otherwise support a means for transmitting the feedback on a beam different than the receive beam indicated by the mapping. In some examples, the transmission-reception beam mapping component 885 may be configured as or otherwise support a means for modifying the mapping between the transmission beam and the receive beam based on transmitting the feedback on the different beam.

In some examples, the transmission-reception beam mapping component 885 may be configured as or otherwise support a means for transmitting, via control signaling, an indication to change the mapping between the transmission beam and the receive beam.

In some examples, the first sidelink message transmission component 825 may be configured as or otherwise support a means for transmitting the first sidelink message in a first transmission time interval of a feedback transmission time interval bundle.

Figure 9:
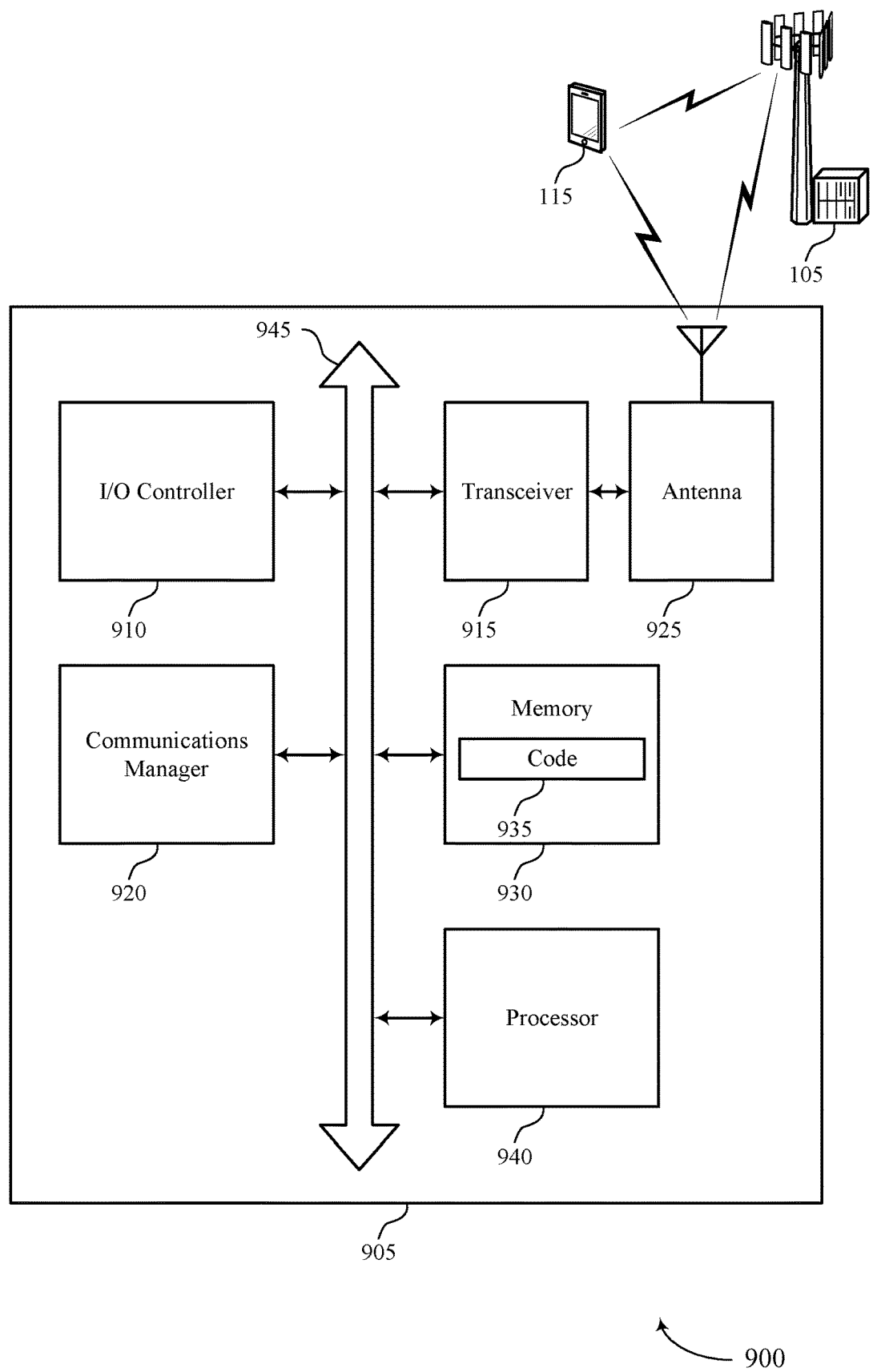
FIG. 9 shows a diagram of a system including a device that supports beam association for sidelink feedback in accordance with aspects of the present disclosure.

FIG. 9 shows a diagram of a system 900 including a device 905 that supports beam association for sidelink feedback in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam association for sidelink feedback). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for transmitting a first sidelink message using a first beam of the first UE, the first sidelink message corresponding to a feedback time interval for feedback for the first sidelink message. The communications manager 920 may be configured as or otherwise support a means for transmitting a second sidelink message using a second beam of the first UE that is different from the first beam, the second sidelink message corresponding to the feedback time interval for feedback for the first sidelink message and for the second sidelink message. The communications manager 920 may be configured as or otherwise support a means for selecting, from one of the first beam or the second beam, a receive beam for receiving feedback during the feedback time interval. The communications manager 920 may be configured as or otherwise support a means for monitoring for feedback using the selected receive beam, where the feedback is associated with the first sidelink message, the second sidelink message, or both.

Additionally or alternatively, the communications manager 920 may support wireless communications at a second UE in accordance with examples as disclosed herein. For example, the communications manager 920 may be configured as or otherwise support a means for receiving a first sidelink message using a first beam of the second UE, the first sidelink message corresponding to a feedback time interval for feedback for the first sidelink message. The communications manager 920 may be configured as or otherwise support a means for receiving a second sidelink message using a second beam of the second UE that is different from the first beam, the second sidelink message corresponding to the feedback time interval for feedback for the first sidelink message and for the second sidelink message. The communications manager 920 may be configured as or otherwise support a means for selecting, from one of the first beam or the second beam, a transmission beam for transmitting feedback during the feedback time interval. The communications manager 920 may be configured as or otherwise support a means for transmitting feedback to a first UE using the selected transmission beam, where the feedback is associated with the first sidelink message, the second sidelink message, or both.

By including or configuring the communications manager 920 in accordance with examples as described herein, the device 905 may support techniques for improved communication reliability, reduced latency, improved user experience related to reduced processing and improved beam selection processes, reduced power consumption, more efficient utilization of communication resources, improved coordination between devices, longer battery life, and improved utilization of beam sweeping and beam selection techniques.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam association for sidelink feedback as described herein, or the processor 940 and the memory 930 may be otherwise configured to perform or support such operations.

Figure 10:
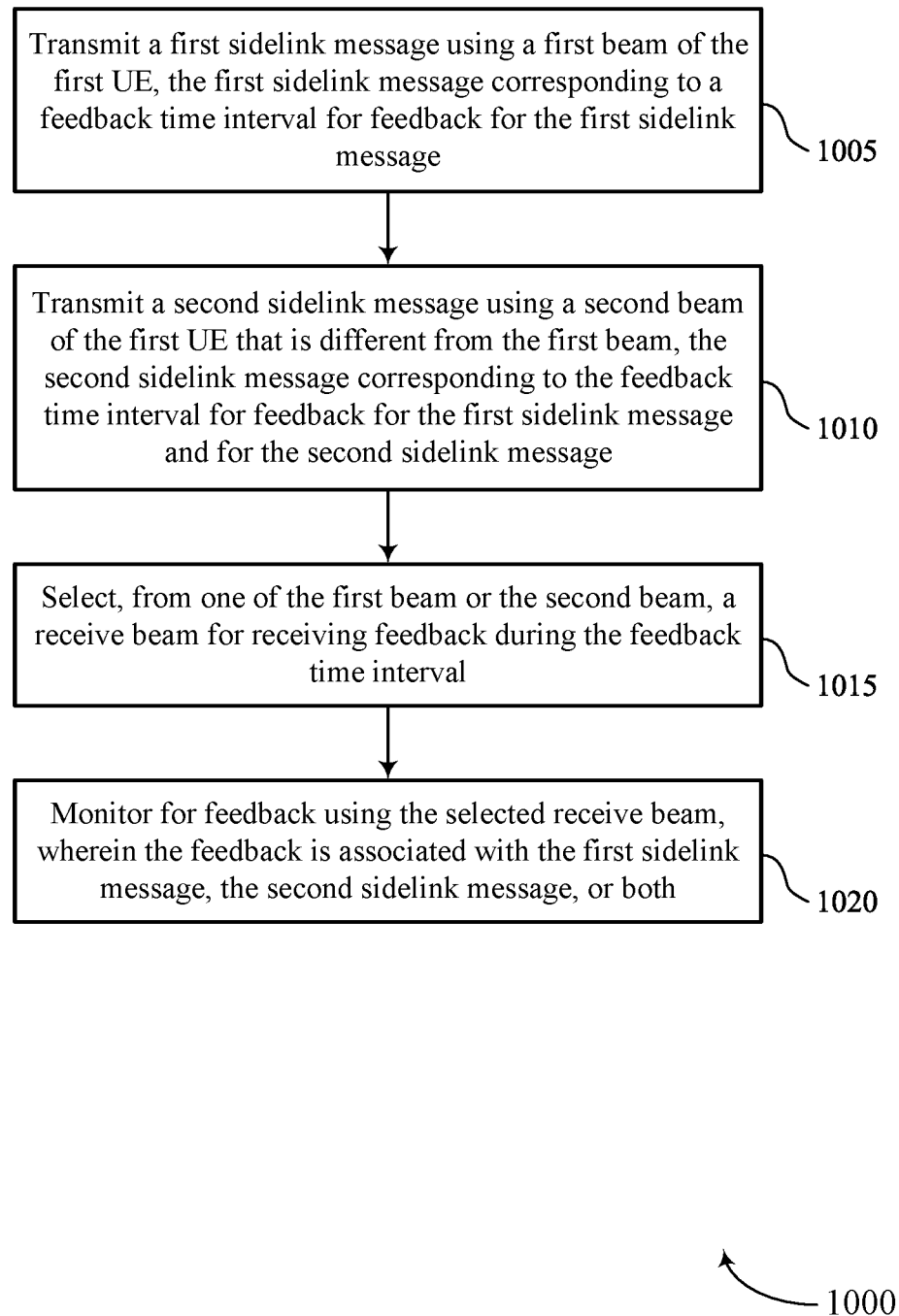
FIGS. 10 through 15 show flowcharts illustrating methods that support beam association for sidelink feedback in accordance with aspects of the present disclosure.

FIG. 10 shows a flowchart illustrating a method 1000 that supports beam association for sidelink feedback in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include transmitting a first sidelink message using a first beam of the first UE, the first sidelink message corresponding to a feedback time interval for feedback for the first sidelink message. The operations of 1005 may be performed in accordance with examples as disclosed herein. In some examples, aspects of the operations of 1005 may be performed by a first sidelink message transmission component 825 as described with reference to FIG. 8.

At 1010, the method may include transmitting a second sidelink message using a second beam of the first UE that is different from the first beam, the second sidelink message corresponding to the feedback time interval for feedback for the first sidelink message and for the second sidelink message. The operations of 1010 may be performed in accordance with examples as disclosed herein. In some examples, aspects of the operations of 1010 may be performed by a second sidelink message transmission component 830 as described with reference to FIG. 8.

At 1015, the method may include selecting, from one of the first beam or the second beam, a receive beam for receiving feedback during the feedback time interval. The operations of 1015 may be performed in accordance with examples as disclosed herein. In some examples, aspects of the operations of 1015 may be performed by a beam selection component 835 as described with reference to FIG. 8.

At 1020, the method may include monitoring for feedback using the selected receive beam, where the feedback is associated with the first sidelink message, the second sidelink message, or both. The operations of 1020 may be performed in accordance with examples as disclosed herein. In some examples, aspects of the operations of 1020 may be performed by a feedback monitoring component 840 as described with reference to FIG. 8.

Figure 11:
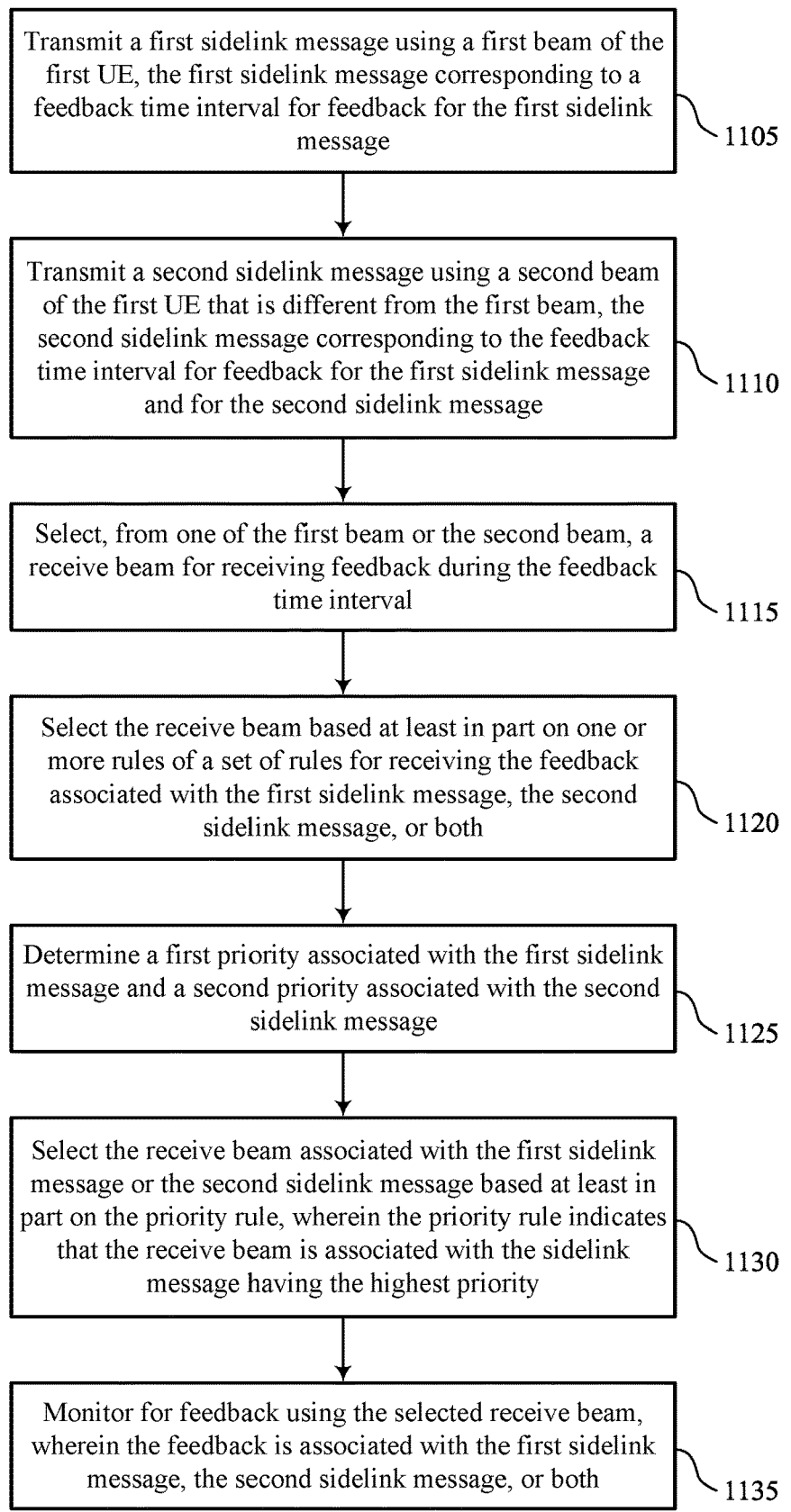

FIG. 11 shows a flowchart illustrating a method 1100 that supports beam association for sidelink feedback in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include transmitting a first sidelink message using a first beam of the first UE, the first sidelink message corresponding to a feedback time interval for feedback for the first sidelink message. The operations of 1105 may be performed in accordance with examples as disclosed herein. In some examples, aspects of the operations of 1105 may be performed by a first sidelink message transmission component 825 as described with reference to FIG. 8.

At 1110, the method may include transmitting a second sidelink message using a second beam of the first UE that is different from the first beam, the second sidelink message corresponding to the feedback time interval for feedback for the first sidelink message and for the second sidelink message. The operations of 1110 may be performed in accordance with examples as disclosed herein. In some examples, aspects of the operations of 1110 may be performed by a second sidelink message transmission component 830 as described with reference to FIG. 8.

At 1115, the method may include selecting, from one of the first beam or the second beam, a receive beam for receiving feedback during the feedback time interval. The operations of 1115 may be performed in accordance with examples as disclosed herein. In some examples, aspects of the operations of 1115 may be performed by a beam selection component 835 as described with reference to FIG. 8.

At 1120, the method may include selecting the receive beam based on one or more rules of a set of rules for receiving the feedback associated with the first sidelink message, the second sidelink message, or both. The operations of 1120 may be performed in accordance with examples as disclosed herein. In some examples, aspects of the operations of 1120 may be performed by a beam selection component 835 as described with reference to FIG. 8.

At 1125, the method may include determining a first priority associated with the first sidelink message and a second priority associated with the second sidelink message. The operations of 1125 may be performed in accordance with examples as disclosed herein. In some examples, aspects of the operations of 1125 may be performed by a priority ranking component 865 as described with reference to FIG. 8.

At 1130, the method may include selecting the receive beam associated with the first sidelink message or the second sidelink message based on the priority rule, where the priority rule indicates that the receive beam is associated with the sidelink message having the highest priority. The operations of 1130 may be performed in accordance with examples as disclosed herein. In some examples, aspects of the operations of 1130 may be performed by a beam selection component 835 as described with reference to FIG. 8.

At 1135, the method may include monitoring for feedback using the selected receive beam, where the feedback is associated with the first sidelink message, the second sidelink message, or both. The operations of 1135 may be performed in accordance with examples as disclosed herein. In some examples, aspects of the operations of 1135 may be performed by a feedback monitoring component 840 as described with reference to FIG. 8.

Figure 12:
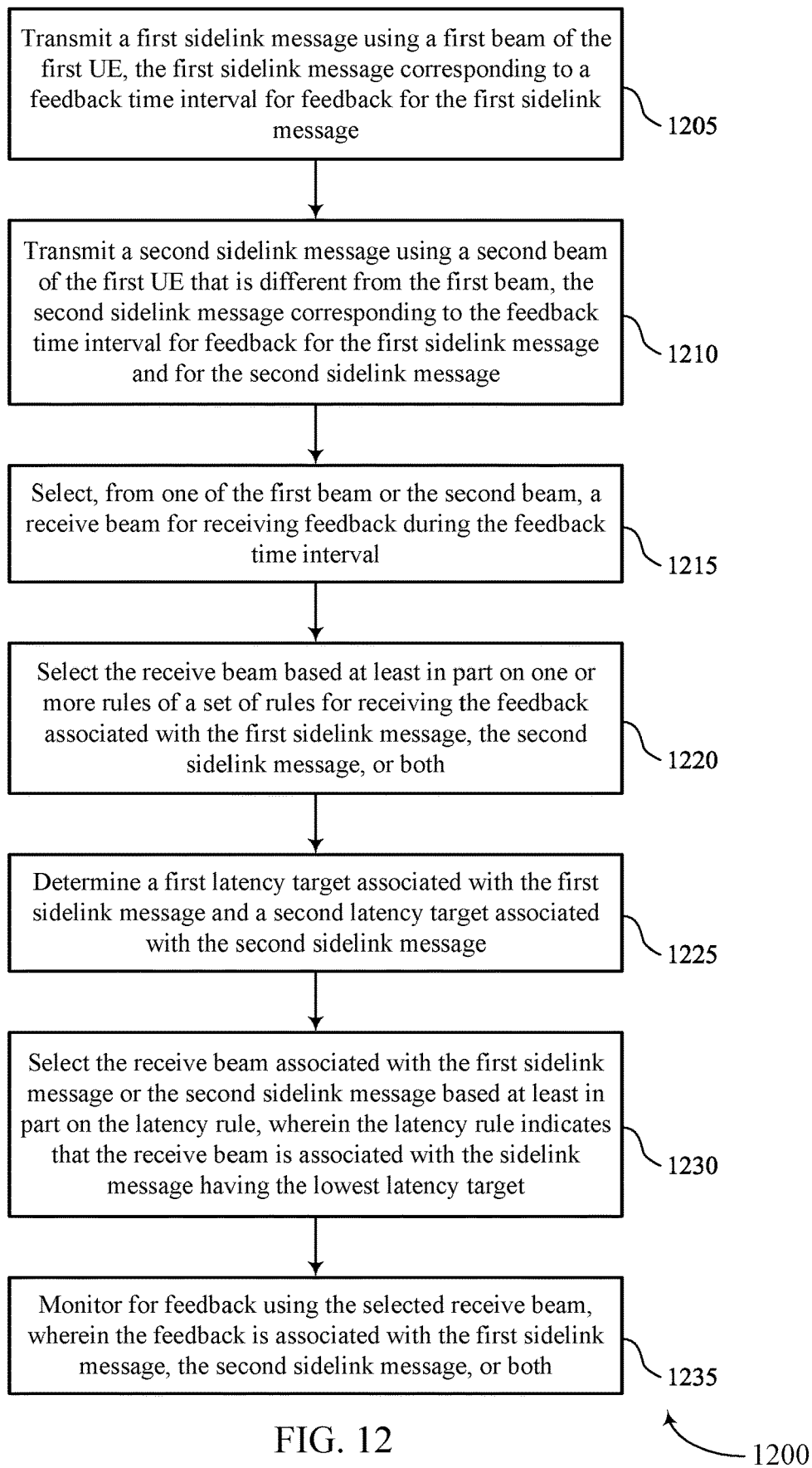

FIG. 12 shows a flowchart illustrating a method 1200 that supports beam association for sidelink feedback in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include transmitting a first sidelink message using a first beam of the first UE, the first sidelink message corresponding to a feedback time interval for feedback for the first sidelink message. The operations of 1205 may be performed in accordance with examples as disclosed herein. In some examples, aspects of the operations of 1205 may be performed by a first sidelink message transmission component 825 as described with reference to FIG. 8.

At 1210, the method may include transmitting a second sidelink message using a second beam of the first UE that is different from the first beam, the second sidelink message corresponding to the feedback time interval for feedback for the first sidelink message and for the second sidelink message. The operations of 1210 may be performed in accordance with examples as disclosed herein. In some examples, aspects of the operations of 1210 may be performed by a second sidelink message transmission component 830 as described with reference to FIG. 8.

At 1215, the method may include selecting, from one of the first beam or the second beam, a receive beam for receiving feedback during the feedback time interval. The operations of 1215 may be performed in accordance with examples as disclosed herein. In some examples, aspects of the operations of 1215 may be performed by a beam selection component 835 as described with reference to FIG. 8.

At 1220, the method may include selecting the receive beam based on one or more rules of a set of rules for receiving the feedback associated with the first sidelink message, the second sidelink message, or both. The operations of 1220 may be performed in accordance with examples as disclosed herein. In some examples, aspects of the operations of 1220 may be performed by a beam selection component 835 as described with reference to FIG. 8.

At 1225, the method may include determining a first latency target associated with the first sidelink message and a second latency target associated with the second sidelink message. The operations of 1225 may be performed in accordance with examples as disclosed herein. In some examples, aspects of the operations of 1225 may be performed by a latency determination component 870 as described with reference to FIG. 8.

At 1230, the method may include selecting the receive beam associated with the first sidelink message or the second sidelink message based on the latency rule, where the latency rule indicates that the receive beam is associated with the sidelink message having the lowest latency target. The operations of 1230 may be performed in accordance with examples as disclosed herein. In some examples, aspects of the operations of 1230 may be performed by a beam selection component 835 as described with reference to FIG. 8.

At 1235, the method may include monitoring for feedback using the selected receive beam, where the feedback is associated with the first sidelink message, the second sidelink message, or both. The operations of 1235 may be performed in accordance with examples as disclosed herein. In some examples, aspects of the operations of 1235 may be performed by a feedback monitoring component 840 as described with reference to FIG. 8.

Figure 13:
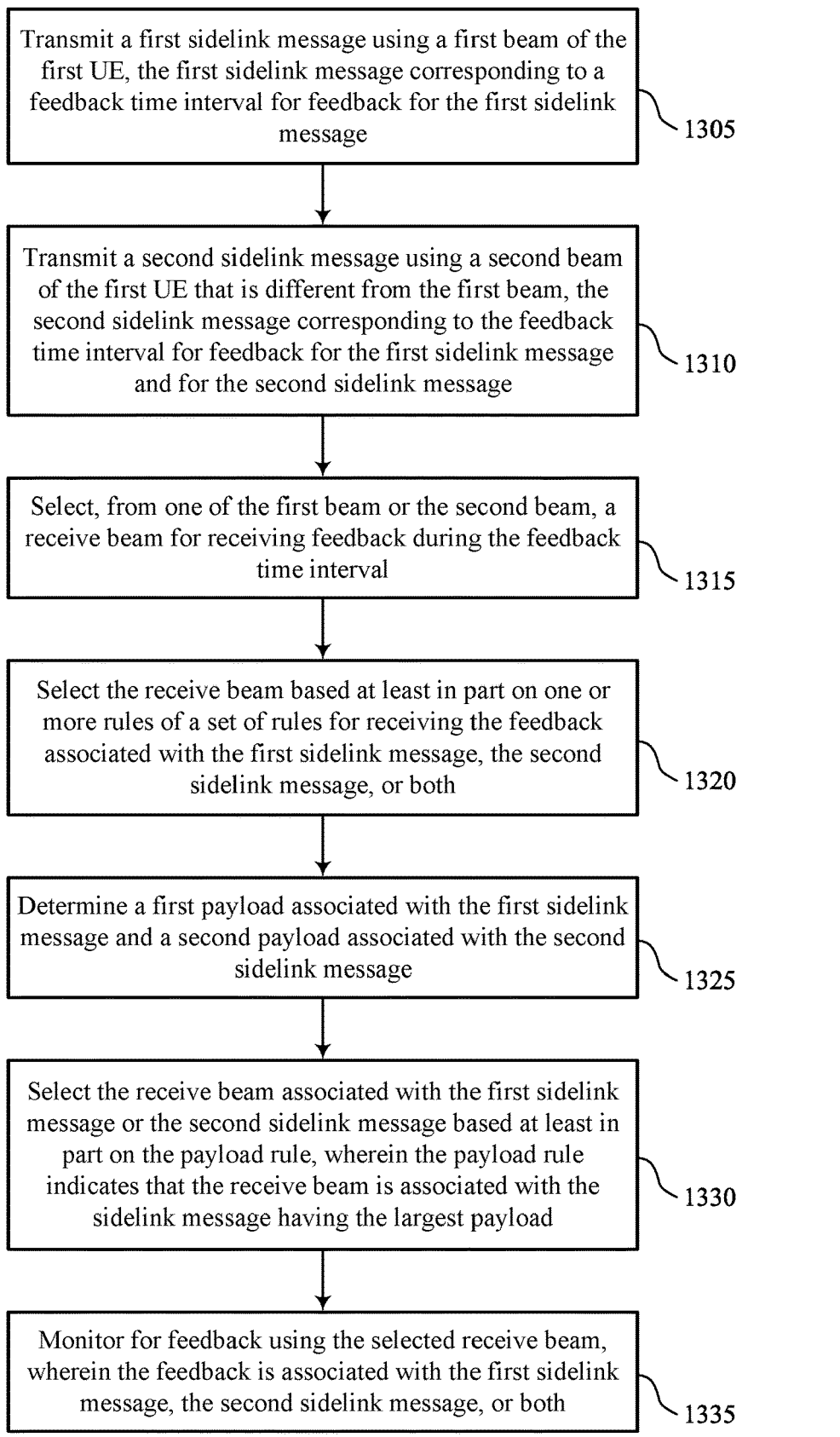

FIG. 13 shows a flowchart illustrating a method 1300 that supports beam association for sidelink feedback in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include transmitting a first sidelink message using a first beam of the first UE, the first sidelink message corresponding to a feedback time interval for feedback for the first sidelink message. The operations of 1305 may be performed in accordance with examples as disclosed herein. In some examples, aspects of the operations of 1305 may be performed by a first sidelink message transmission component 825 as described with reference to FIG. 8.

At 1310, the method may include transmitting a second sidelink message using a second beam of the first UE that is different from the first beam, the second sidelink message corresponding to the feedback time interval for feedback for the first sidelink message and for the second sidelink message. The operations of 1310 may be performed in accordance with examples as disclosed herein. In some examples, aspects of the operations of 1310 may be performed by a second sidelink message transmission component 830 as described with reference to FIG. 8.

At 1315, the method may include selecting, from one of the first beam or the second beam, a receive beam for receiving feedback during the feedback time interval. The operations of 1315 may be performed in accordance with examples as disclosed herein. In some examples, aspects of the operations of 1315 may be performed by a beam selection component 835 as described with reference to FIG. 8.

At 1320, the method may include selecting the receive beam based on one or more rules of a set of rules for receiving the feedback associated with the first sidelink message, the second sidelink message, or both. The operations of 1320 may be performed in accordance with examples as disclosed herein. In some examples, aspects of the operations of 1320 may be performed by a beam selection component 835 as described with reference to FIG. 8.

At 1325, the method may include determining a first payload associated with the first sidelink message and a second payload associated with the second sidelink message. The operations of 1325 may be performed in accordance with examples as disclosed herein. In some examples, aspects of the operations of 1325 may be performed by a sidelink payload component 875 as described with reference to FIG. 8.

At 1330, the method may include selecting the receive beam associated with the first sidelink message or the second sidelink message based on the payload rule, where the payload rule indicates that the receive beam is associated with the sidelink message having the largest payload. The operations of 1330 may be performed in accordance with examples as disclosed herein. In some examples, aspects of the operations of 1330 may be performed by a beam selection component 835 as described with reference to FIG. 8.

At 1335, the method may include monitoring for feedback using the selected receive beam, where the feedback is associated with the first sidelink message, the second sidelink message, or both. The operations of 1335 may be performed in accordance with examples as disclosed herein. In some examples, aspects of the operations of 1335 may be performed by a feedback monitoring component 840 as described with reference to FIG. 8.

Figure 14:
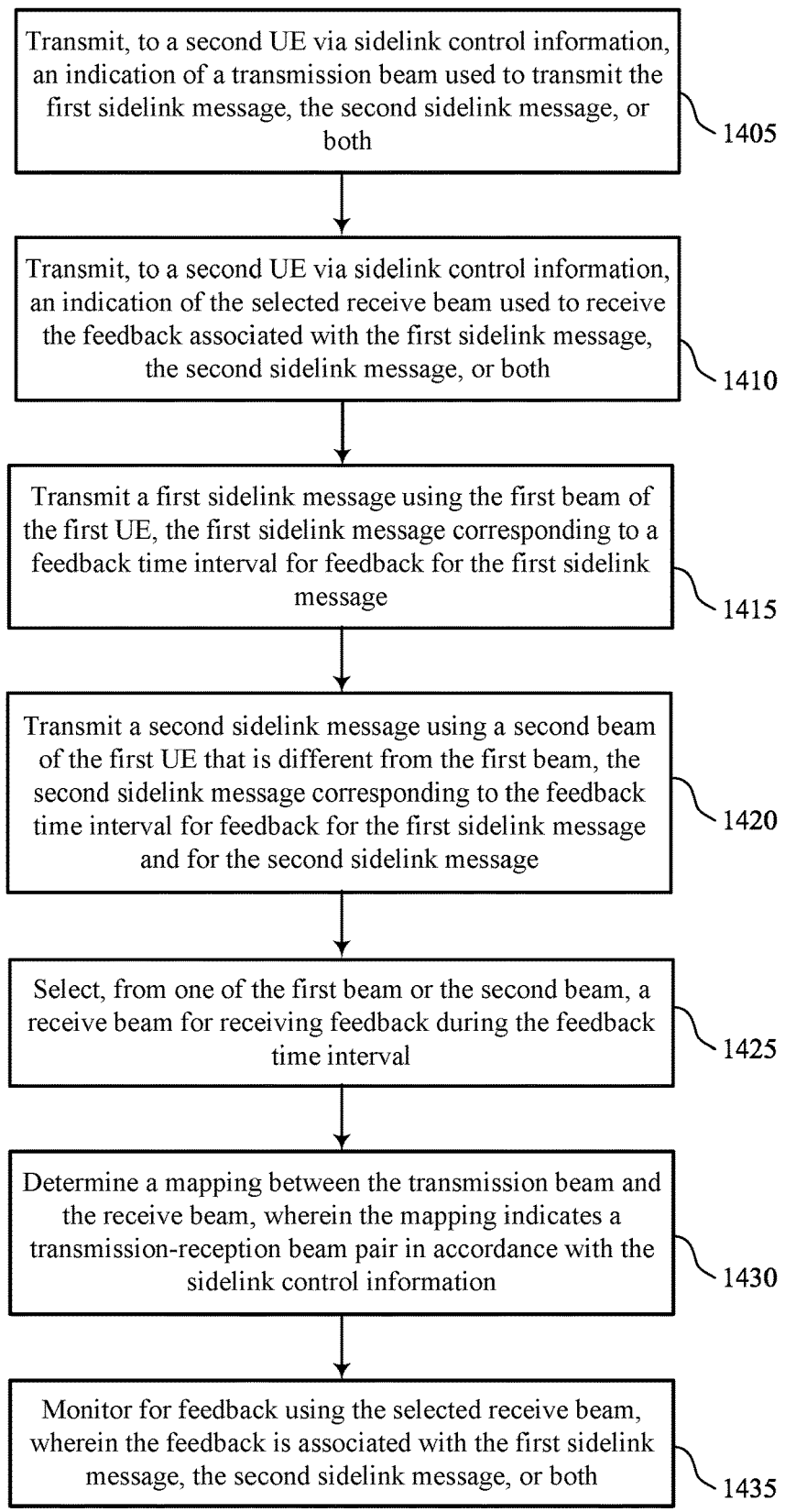

FIG. 14 shows a flowchart illustrating a method 1400 that supports beam association for sidelink feedback in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a second UE via sidelink control information, an indication of a transmission beam used to transmit a first sidelink message, a second sidelink message, or both. The operations of 1405 may be performed in accordance with examples as disclosed herein. In some examples, aspects of the operations of 1405 may be performed by a beam selection component 835 as described with reference to FIG. 8.

At 1410, the method may include transmitting, to a second UE via sidelink control information, an indication of the selected receive beam used to receive the feedback associated with the first sidelink message, the second sidelink message, or both. The operations of 1410 may be performed in accordance with examples as disclosed herein. In some examples, aspects of the operations of 1410 may be performed by a beam selection component 835 as described with reference to FIG. 8.

At 1415, the method may include transmitting the first sidelink message using a first beam of the first UE, the first sidelink message corresponding to a feedback time interval for feedback for the first sidelink message. The operations of 1415 may be performed in accordance with examples as disclosed herein. In some examples, aspects of the operations of 1415 may be performed by a first sidelink message transmission component 825 as described with reference to FIG. 8.

At 1420, the method may include transmitting a second sidelink message using a second beam of the first UE that is different from the first beam, the second sidelink message corresponding to the feedback time interval for feedback for the first sidelink message and for the second sidelink message. The operations of 1420 may be performed in accordance with examples as disclosed herein. In some examples, aspects of the operations of 1420 may be performed by a second sidelink message transmission component 830 as described with reference to FIG. 8.

At 1425, the method may include selecting, from one of the first beam or the second beam, a receive beam for receiving feedback during the feedback time interval. The operations of 1425 may be performed in accordance with examples as disclosed herein. In some examples, aspects of the operations of 1425 may be performed by a beam selection component 835 as described with reference to FIG. 8.

At 1430, the method may include determining a mapping between the transmission beam and the receive beam, where the mapping indicates a transmission-reception beam pair in accordance with the sidelink control information. The operations of 1430 may be performed in accordance with examples as disclosed herein. In some examples, aspects of the operations of 1430 may be performed by a transmission-reception beam mapping component 885 as described with reference to FIG. 8.

At 1435, the method may include monitoring for feedback using the selected receive beam, where the feedback is associated with the first sidelink message, the second sidelink message, or both. The operations of 1435 may be performed in accordance with examples as disclosed herein. In some examples, aspects of the operations of 1435 may be performed by a feedback monitoring component 840 as described with reference to FIG. 8.

Figure 15:
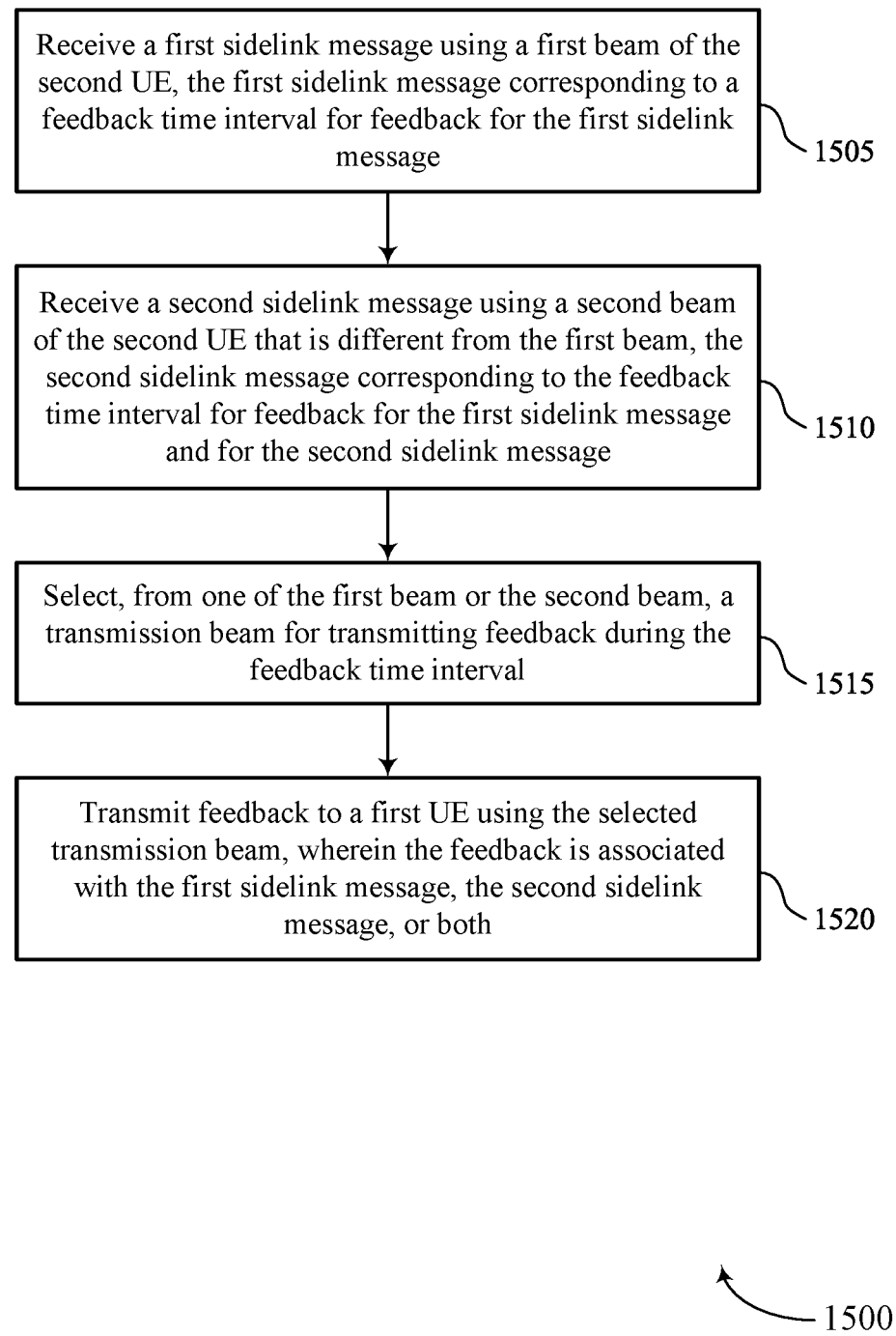

FIG. 15 shows a flowchart illustrating a method 1500 that supports beam association for sidelink feedback in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a first sidelink message using a first beam of the second UE, the first sidelink message corresponding to a feedback time interval for feedback for the first sidelink message. The operations of 1505 may be performed in accordance with examples as disclosed herein. In some examples, aspects of the operations of 1505 may be performed by a first sidelink message receive component 845 as described with reference to FIG. 8.

At 1510, the method may include receiving a second sidelink message using a second beam of the second UE that is different from the first beam, the second sidelink message corresponding to the feedback time interval for feedback for the first sidelink message and for the second sidelink message. The operations of 1510 may be performed in accordance with examples as disclosed herein. In some examples, aspects of the operations of 1510 may be performed by a second sidelink message receive component 850 as described with reference to FIG. 8.

At 1515, the method may include selecting, from one of the first beam or the second beam, a transmission beam for transmitting feedback during the feedback time interval. The operations of 1515 may be performed in accordance with examples as disclosed herein. In some examples, aspects of the operations of 1515 may be performed by a transmission beam selection component 855 as described with reference to FIG. 8.

At 1520, the method may include transmitting feedback to a first UE using the selected transmission beam, where the feedback is associated with the first sidelink message, the second sidelink message, or both. The operations of 1520 may be performed in accordance with examples as disclosed herein. In some examples, aspects of the operations of 1520 may be performed by a feedback transmission component 860 as described with reference to FIG. 8.

The following provides an overview of aspects of the present disclosure:

Aspect 1: A method for wireless communications at a first UE, comprising: transmitting a first sidelink message using a first beam of the first UE, the first sidelink message corresponding to a feedback time interval for feedback for the first sidelink message; transmitting a second sidelink message using a second beam of the first UE that is different from the first beam, the second sidelink message corresponding to the feedback time interval for feedback for the first sidelink message and for the second sidelink message; selecting, from one of the first beam or the second beam, a receive beam for receiving feedback during the feedback time interval; and monitoring for feedback using the selected receive beam, wherein the feedback is associated with the first sidelink message, the second sidelink message, or both.

Aspect 2: The method of aspect 1, further comprising: selecting the receive beam based at least in part on one or more rules of a set of rules for receiving the feedback associated with the first sidelink message, the second sidelink message, or both.

Aspect 3: The method of aspect 2, wherein the one or more rules comprises a priority rule, the method further comprising: determining a first priority associated with the first sidelink message and a second priority associated with the second sidelink message; and selecting the receive beam associated with the first sidelink message or the second sidelink message based at least in part on the priority rule, wherein the priority rule indicates that the receive beam is associated with the sidelink message having the highest priority.

Aspect 4: The method of any of aspects 2 through 3, wherein the one or more rules comprises a latency rule, the method further comprising: determining a first latency target associated with the first sidelink message and a second latency target associated with the second sidelink message; and selecting the receive beam associated with the first sidelink message or the second sidelink message based at least in part on the latency rule, wherein the latency rule indicates that the receive beam is associated with the sidelink message having the lowest latency target.

Aspect 5: The method of any of aspects 2 through 4, wherein the one or more rules comprises a payload rule, the method further comprising: determining a first payload associated with the first sidelink message and a second payload associated with the second sidelink message; and selecting the receive beam associated with the first sidelink message or the second sidelink message based at least in part on the payload rule, wherein the payload rule indicates that the receive beam is associated with the sidelink message having the largest payload.

Aspect 6: The method of any of aspects 2 through 5, wherein the one or more rules comprises a transmission timing rule, the method further comprising: determining a transmission time for the first sidelink message and a second time of transmission for the second sidelink message; selecting the receive beam associated with the first sidelink message or the second sidelink message based at least in part on the transmission timing rule, wherein the transmission timing rule indicates that the receive beam is associated with the sidelink message having an earliest transmission time.

Aspect 7: The method of any of aspects 1 through 6, further comprising: transmitting, to a second UE via SCI, an indication of a transmission beam used to transmit the first sidelink message, the second sidelink message, or both; and transmitting, to a second UE via SCI, an indication of the selected receive beam used to receive the feedback associated with the first sidelink message, the second sidelink message, or both.

Aspect 8: The method of aspect 7, wherein the indication of the transmission beam comprises a transmission configuration indicator state, a precoder index, a precoder identifier, a transmit beam ID, or any combination thereof.

Aspect 9: The method of any of aspects 7 through 8, wherein the indication of the receive beam comprises a transmission configuration indicator state, a precoder index, a precoder identifier, a feedback beam ID, or any combination thereof.

Aspect 10: The method of any of aspects 7 through 9, wherein the indication of the transmission beam comprises a transmission beam ID and the indication of the receive beam comprises a feedback beam ID, the method further comprising: receiving the feedback using the receive beam, wherein a direction of the selected receive beam is the same as a direction of the transmission beam based at least in part on the transmission beam ID being the same as the feedback beam ID.

Aspect 11: The method of any of aspects 7 through 10, wherein the indication of the transmission beam comprises a transmission beam ID and the indication of the receive beam comprises a feedback beam ID, the method further comprising: receiving the feedback using the receive beam, wherein a direction of the selected receive beam is different from a direction of the transmission beam based at least in part on the transmission beam ID being different from the feedback beam ID.

Aspect 12: The method of aspect 11, further comprising: transmitting a packet on a beam associated with the transmission beam ID; and receiving the feedback using the beam that the packet was transmitted on.

Aspect 13: The method of any of aspects 11 through 12, further comprising: receiving the feedback using a beam corresponding to the transmission beam ID.

Aspect 14: The method of any of aspects 7 through 13, further comprising: determining a mapping between the transmission beam and the receive beam, wherein the mapping indicates a transmission-reception beam pair in accordance with the SCI.

Aspect 15: The method of aspect 14, further comprising: maintaining the mapping between the transmission beam and the receive beam for a time duration indicated by a timer.

Aspect 16: The method of any of aspects 14 through 15, further comprising: receiving the feedback on a beam different than the receive beam indicated by the mapping; and modifying the mapping between the transmission beam and the receive beam based at least in part on receiving the feedback on the different beam.

Aspect 17: The method of any of aspects 14 through 16, further comprising: receiving, via control signaling, an indication to change the mapping between the transmission beam and the receive beam.

Aspect 18: The method of any of aspects 1 through 17, further comprising: transmitting the first sidelink message in a first TTI of a feedback TTI bundle.

Aspect 19: A method for wireless communications at a second UE, comprising: receiving a first sidelink message using a first beam of the second UE, the first sidelink message corresponding to a feedback time interval for feedback for the first sidelink message; receiving a second sidelink message using a second beam of the second UE that is different from the first beam, the second sidelink message corresponding to the feedback time interval for feedback for the first sidelink message and for the second sidelink message; selecting, from one of the first beam or the second beam, a transmission beam for transmitting feedback during the feedback time interval; and transmitting feedback to a first UE using the selected transmission beam, wherein the feedback is associated with the first sidelink message, the second sidelink message, or both.

Aspect 20: The method of aspect 19, further comprising: transmitting the transmission beam based at least in part on one or more rules of a set of rules the first UE implements for receiving the feedback associated with the first sidelink message, the second sidelink message, or both.

Aspect 21: The method of aspect 20, wherein the one or more rules comprises a priority rule, the method further comprising: determining a first priority associated with the first sidelink message and a second priority associated with the second sidelink message; and selecting the transmission beam associated with the first sidelink message or the second sidelink message based at least in part on the priority rule, wherein the priority rule indicates that the receive beam selected by the first UE is associated with the sidelink message having the highest priority.

Aspect 22: The method of any of aspects 20 through 21, wherein the one or more rules comprises a latency rule, the method further comprising: determining a first latency target associated with the first sidelink message and a second latency target associated with the second sidelink message; and selecting the transmission beam associated with the first sidelink message or the second sidelink message based at least in part on the latency rule, wherein the latency rule indicates that the receive beam selected by the first UE is associated with the sidelink message having the lowest latency target.

Aspect 23: The method of any of aspects 20 through 22, wherein the one or more rules comprises a payload rule, the method further comprising: determining a first payload associated with the first sidelink message and a second payload associated with the second sidelink message; and selecting the transmission beam associated with the first sidelink message or the second sidelink message based at least in part on the payload rule, wherein the payload rule indicates that the receive beam selected by the first UE is associated with the sidelink message having the largest payload.

Aspect 24: The method of any of aspects 20 through 23, wherein the one or more rules comprises a transmission timing rule, the method further comprising: determining a first transmission time for the first sidelink message and a second time of transmission for the second sidelink message; selecting the transmission beam associated with the first sidelink message or the second sidelink message based at least in part on the transmission timing rule, wherein the transmission timing rule indicates that the receive beam is associated with the sidelink message having an earliest transmission time.

Aspect 25: The method of any of aspects 19 through 24, further comprising: receiving, from the first UE via SCI, an indication of a receive beam for receiving the first sidelink message, the second sidelink message, or both; and receiving, from the first UE via SCI, an indication of the transmission beam for transmitting the feedback associated with the first sidelink message, the second sidelink message, or both.

Aspect 26: The method of aspect 25, wherein the indication of the transmission beam comprises a transmission configuration indicator state, a precoder index, a precoder identifier, a transmit beam ID, or any combination thereof.

Aspect 27: The method of any of aspects 25 through 26, wherein the indication of the receive beam comprises a transmission configuration indicator state, a precoder index, a precoder identifier, a feedback beam ID, or any combination thereof.

Aspect 28: The method of any of aspects 25 through 27, wherein the indication of the receive beam comprises a transmission beam ID and the indication of the transmission beam comprises a feedback beam ID, the method further comprising: transmitting the feedback using the transmission beam, wherein a direction of the transmission beam is the same as a direction of the receive beam based at least in part on the transmission beam ID being the same as the feedback beam ID.

Aspect 29: An apparatus for wireless communications at a first UE, comprising a processor; memory coupled with the processor; and instructions stored in the memory and executable by the processor to cause the apparatus to perform a method of any of aspects 1 through 18.

Aspect 30: An apparatus for wireless communications at a first UE, comprising at least one means for performing a method of any of aspects 1 through 18.

Aspect 31: A non-transitory computer-readable medium storing code for wireless communications at a first UE, the code comprising instructions executable by a processor to perform a method of any of aspects 1 through 18.

Aspect 32: An apparatus for wireless communications at a second UE, comprising a processor; memory coupled with the processor; and instructions stored in the memory and executable by the processor to cause the apparatus to perform a method of any of aspects 19 through 28.

Aspect 33: An apparatus for wireless communications at a second UE, comprising at least one means for performing a method of any of aspects 19 through 28.

Aspect 34: A non-transitory computer-readable medium storing code for wireless communications at a second UE, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    transmitting a first sidelink message using a first beam of the first UE, the first sidelink message corresponding to a feedback time interval for feedback for the first sidelink message;
    transmitting a second sidelink message using a second beam of the first UE that is different from the first beam, the second sidelink message corresponding to the feedback time interval for feedback for the first sidelink message and for the second sidelink message;
    selecting, from one of the first beam or the second beam, a receive beam for receiving feedback during the feedback time interval; and
    monitoring for feedback using the selected receive beam, wherein the feedback is associated with the first sidelink message, the second sidelink message, or both.

2. The method of claim 1, further comprising:
    selecting the receive beam based at least in part on one or more rules of a set of rules for receiving the feedback associated with the first sidelink message, the second sidelink message, or both.

3. The method of claim 2, wherein the one or more rules comprises a priority rule, the method further comprising:
    determining a first priority associated with the first sidelink message and a second priority associated with the second sidelink message; and
    selecting the receive beam associated with the first sidelink message or the second sidelink message based at least in part on the priority rule, wherein the priority rule indicates that the receive beam is associated with the sidelink message having the highest priority.

4. The method of claim 2, wherein the one or more rules comprises a latency rule, the method further comprising:
    determining a first latency target associated with the first sidelink message and a second latency target associated with the second sidelink message; and
    selecting the receive beam associated with the first sidelink message or the second sidelink message based at least in part on the latency rule, wherein the latency rule indicates that the receive beam is associated with the sidelink message having the lowest latency target.

5. The method of claim 2, wherein the one or more rules comprises a payload rule, the method further comprising:

determining a first payload associated with the first sidelink message and a second payload associated with the second sidelink message; and selecting the receive beam associated with the first sidelink message or the second sidelink message based at least in part on the payload rule, wherein the payload rule indicates that the receive beam is associated with the sidelink message having the largest payload.

6. The method of claim 2, wherein the one or more rules comprises a transmission timing rule, the method further comprising:

determining a transmission time for the first sidelink message and a second time of transmission for the second sidelink message;

selecting the receive beam associated with the first sidelink message or the second sidelink message based at least in part on the transmission timing rule, wherein the transmission timing rule indicates that the receive beam is associated with the sidelink message having an earliest transmission time.

7. The method of claim 1, further comprising:

transmitting, to a second UE via sidelink control information, an indication of a transmission beam used to transmit the first sidelink message, the second sidelink message, or both; and transmitting, to a second UE via sidelink control information, an indication of the selected receive beam used to receive the feedback associated with the first sidelink message, the second sidelink message, or both.

8. The method of claim 7, wherein the indication of the transmission beam comprises a transmission configuration indicator state, a precoder index, a precoder identifier, a transmit beam identifier, or any combination thereof.

9. The method of claim 7, wherein the indication of the receive beam comprises a transmission configuration indicator state, a precoder index, a precoder identifier, a feedback beam identifier, or any combination thereof.

10. The method of claim 7, wherein the indication of the transmission beam comprises a transmission beam identifier and the indication of the receive beam comprises a feedback beam identifier, the method further comprising:

receiving the feedback using the receive beam, wherein a direction of the selected receive beam is the same as a direction of the transmission beam based at least in part on the transmission beam identifier being the same as the feedback beam identifier.

11. The method of claim 7, wherein the indication of the transmission beam comprises a transmission beam identifier and the indication of the receive beam comprises a feedback beam identifier, the method further comprising:

receiving the feedback using the receive beam, wherein a direction of the selected receive beam is different from a direction of the transmission beam based at least in part on the transmission beam identifier being different from the feedback beam identifier.

12. The method of claim 11, further comprising:

transmitting a packet on a beam associated with the transmission beam identifier; and receiving the feedback using the beam that the packet was transmitted on.

13. The method of claim 11, further comprising:

receiving the feedback using a beam corresponding to the transmission beam identifier.

14. The method of claim 7, further comprising:

determining a mapping between the transmission beam and the receive beam, wherein the mapping indicates a transmission-reception beam pair in accordance with the sidelink control information.

15. The method of claim 14, further comprising:

maintaining the mapping between the transmission beam and the receive beam for a time duration indicated by a timer.

16. The method of claim 14, further comprising:

receiving the feedback on a beam different than the receive beam indicated by the mapping; and modifying the mapping between the transmission beam and the receive beam based at least in part on receiving the feedback on the different beam.

17. The method of claim 14, further comprising:

receiving, via control signaling, an indication to change the mapping between the transmission beam and the receive beam.

18. The method of claim 1, further comprising:

transmitting the first sidelink message in a first transmission time interval of a feedback transmission time interval bundle.

19. A method for wireless communications at a second user equipment (UE), comprising:

receiving a first sidelink message using a first beam of the second UE, the first sidelink message corresponding to a feedback time interval for feedback for the first sidelink message;

receiving a second sidelink message using a second beam of the second UE that is different from the first beam, the second sidelink message corresponding to the feedback time interval for feedback for the first sidelink message and for the second sidelink message;

selecting, from one of the first beam or the second beam, a transmission beam for transmitting feedback during the feedback time interval; and transmitting feedback to a first UE using the selected transmission beam, wherein the feedback is associated with the first sidelink message, the second sidelink message, or both.

20. The method of claim 19, further comprising:

transmitting the transmission beam based at least in part on one or more rules of a set of rules the first UE implements for receiving the feedback associated with the first sidelink message, the second sidelink message, or both.

21. The method of claim 20, wherein the one or more rules comprises a priority rule, the method further comprising:

determining a first priority associated with the first sidelink message and a second priority associated with the second sidelink message; and selecting the transmission beam associated with the first sidelink message or the second sidelink message based at least in part on the priority rule, wherein the priority rule indicates that the receive beam selected by the first UE is associated with the sidelink message having the highest priority.

22. The method of claim 20, wherein the one or more rules comprises a latency rule, the method further comprising:

determining a first latency target associated with the first sidelink message and a second latency target associated with the second sidelink message; and selecting the transmission beam associated with the first sidelink message or the second sidelink message based at least in part on the latency rule, wherein the latency rule indicates that the receive beam selected by the first UE is associated with the sidelink message having the lowest latency target.

23. The method of claim 20, wherein the one or more rules comprises a payload rule, the method further comprising:
- determining a first payload associated with the first sidelink message and a second payload associated with the second sidelink message; and
- selecting the transmission beam associated with the first sidelink message or the second sidelink message based at least in part on the payload rule, wherein the payload rule indicates that the receive beam selected by the first UE is associated with the sidelink message having the largest payload.

24. The method of claim 20, wherein the one or more rules comprises a transmission timing rule, the method further comprising:
- determining a first transmission time for the first sidelink message and a second time of transmission for the second sidelink message;
- selecting the transmission beam associated with the first sidelink message or the second sidelink message based at least in part on the transmission timing rule, wherein the transmission timing rule indicates that the receive beam is associated with the sidelink message having an earliest transmission time.

25. The method of claim 19, further comprising:
- receiving, from the first UE via sidelink control information, an indication of a receive beam for receiving the first sidelink message, the second sidelink message, or both; and
- receiving, from the first UE via sidelink control information, an indication of the transmission beam for transmitting the feedback associated with the first sidelink message, the second sidelink message, or both.

26. The method of claim 25, wherein the indication of the transmission beam comprises a transmission configuration indicator state, a precoder index, a precoder identifier, a transmit beam identifier, or any combination thereof.

27. The method of claim 25, wherein the indication of the receive beam comprises a transmission configuration indicator state, a precoder index, a precoder identifier, a feedback beam identifier, or any combination thereof.

28. The method of claim 25, wherein the indication of the receive beam comprises a transmission beam identifier and the indication of the transmission beam comprises a feedback beam identifier, the method further comprising:
- transmitting the feedback using the transmission beam, wherein a direction of the transmission beam is the same as a direction of the receive beam based at least in part on the transmission beam identifier being the same as the feedback beam identifier.

29. An apparatus for wireless communications at a first user equipment (UE), comprising:
- a processor;
- memory coupled with the processor; and
- instructions stored in the memory and executable by the processor to cause the apparatus to:
  - transmit a first sidelink message using a first beam of the first UE, the first sidelink message corresponding to a feedback time interval for feedback for the first sidelink message;
  - transmit a second sidelink message using a second beam of the first UE that is different from the first beam, the second sidelink message corresponding to the feedback time interval for feedback for the first sidelink message and for the second sidelink message;
  - select, from one of the first beam or the second beam, a receive beam for receiving feedback during the feedback time interval; and
  - monitor for feedback using the selected receive beam, wherein the feedback is associated with the first sidelink message, the second sidelink message, or both.

30. An apparatus for wireless communications at a second user equipment (UE), comprising:
- a processor;
- memory coupled with the processor; and
- instructions stored in the memory and executable by the processor to cause the apparatus to:
  - receive a first sidelink message using a first beam of the second UE, the first sidelink message corresponding to a feedback time interval for feedback for the first sidelink message;
  - receive a second sidelink message using a second beam of the second UE that is different from the first beam, the second sidelink message corresponding to the feedback time interval for feedback for the first sidelink message and for the second sidelink message;
  - select, from one of the first beam or the second beam, a transmission beam for transmitting feedback during the feedback time interval; and
  - transmit feedback to a first UE using the selected transmission beam, wherein the feedback is associated with the first sidelink message, the second sidelink message, or both.

* * * * *